(12) United States Patent
Bernat et al.

(10) Patent No.: US 11,086,532 B2
(45) Date of Patent: *Aug. 10, 2021

(54) DATA REBUILD WITH CHANGING ERASE BLOCK SIZES

(71) Applicant: Pure Storage, Inc., Mountain View, CA (US)

(72) Inventors: Andrew R. Bernat, Mountain View, CA (US); Timothy W. Brennan, San Francisco, CA (US); Mark L. McAuliffe, San Francisco, CA (US); Neil Buda Vachharajani, Menlo Park, CA (US)

(73) Assignee: Pure Storage, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/751,211

(22) Filed: Jan. 24, 2020

(65) Prior Publication Data

US 2020/0159423 A1    May 21, 2020

Related U.S. Application Data

(63) Continuation of application No. 15/799,955, filed on Oct. 31, 2017, now Pat. No. 10,545,687.

(51) Int. Cl.
  *G06F 3/06* (2006.01)
  *G06F 12/10* (2016.01)

(52) U.S. Cl.
  CPC ............ *G06F 3/0619* (2013.01); *G06F 3/064* (2013.01); *G06F 3/0631* (2013.01);
  (Continued)

(58) Field of Classification Search
  CPC ...... G06F 3/0619; G06F 3/0631; G06F 3/064; G06F 3/0659; G06F 3/0688; G06F 12/10;
  (Continued)

(56) References Cited

U.S. PATENT DOCUMENTS

| 5,390,327 | A | ‡ | 2/1995 | Lubbers | ............. | G06F 11/1084 |
| | | | | | | 714/6 |
| 5,450,581 | A | | 9/1995 | Bergen et al. | | |

(Continued)

FOREIGN PATENT DOCUMENTS

| EP | 2164006 | ‡ | 3/2010 |
| EP | 2256621 | ‡ | 12/2010 |

(Continued)

OTHER PUBLICATIONS

International Search Report, PCT/US2016/014356, dated Jun. 28, 2016.‡

(Continued)

*Primary Examiner* — Masud K Khan
(74) *Attorney, Agent, or Firm* — Womble Bond Dickinson (US) LLP

(57) ABSTRACT

A method for rebuilding data when changing erase block sizes in a storage system is provided. The method includes determining one or more erase blocks to be rebuilt and allocating one or more replacement erase blocks, wherein the one or more erase blocks and the one or more replacement erase blocks have differing erase block sizes. The method includes mapping logical addresses, for the one or more erase blocks, to the one or more replacement erase blocks and rebuilding the one or more erase blocks into the one or more replacement erase blocks, in accordance with the mapping.

20 Claims, 17 Drawing Sheets

(52) U.S. Cl.
CPC .......... *G06F 3/0659* (2013.01); *G06F 3/0688* (2013.01); *G06F 12/10* (2013.01); *G06F 3/0607* (2013.01); *G06F 2212/1032* (2013.01); *G06F 2212/2022* (2013.01); *G06F 2212/262* (2013.01); *G06F 2212/7202* (2013.01); *G06F 2212/7206* (2013.01); *G06F 2212/7208* (2013.01)

(58) Field of Classification Search
CPC .......... G06F 3/0607; G06F 2212/1032; G06F 2212/2022; G06F 2212/262; G06F 2212/7202; G06F 2212/7206; G06F 2212/7208
See application file for complete search history.

(56) References Cited

U.S. PATENT DOCUMENTS

| | | | |
|---|---|---|---|
| 5,479,653 A ‡ | 12/1995 | Jones | G06F 11/1084 711/11 |
| 5,488,731 A | 1/1996 | Mendelsohn | |
| 5,504,858 A | 4/1996 | Ellis et al. | |
| 5,564,113 A | 10/1996 | Bergen et al. | |
| 5,574,882 A | 11/1996 | Menon et al. | |
| 5,649,093 A ‡ | 7/1997 | Hanko | G06F 11/1076 |
| 5,883,909 A | 3/1999 | Dekoning et al. | |
| 6,000,010 A | 12/1999 | Legg | |
| 6,260,156 B1 | 7/2001 | Garvin et al. | |
| 6,269,453 B1 | 7/2001 | Krantz | |
| 6,275,898 B1 ‡ | 8/2001 | DeKoning | G06F 3/0605 711/11 |
| 1,001,317 A1 | 5/2002 | Liu et al. | |
| 6,453,428 B1 | 9/2002 | Stephenson | |
| 6,523,087 B2 | 2/2003 | Busser | |
| 6,535,417 B2 ‡ | 3/2003 | Tsuda | G11C 11/412 365/15 |
| 6,643,748 B1 ‡ | 11/2003 | Wieland | G06F 13/387 707/99 |
| 6,725,392 B1 ‡ | 4/2004 | Frey | G06F 11/1076 714/15 |
| 6,763,455 B2 | 7/2004 | Hall | |
| 6,836,816 B2 ‡ | 12/2004 | Kendall | G06F 12/0802 711/11 |
| 6,985,995 B2 ‡ | 1/2006 | Holland | G06F 11/1076 707/99 |
| 7,032,125 B2 ‡ | 4/2006 | Holt | G06F 3/0601 711/11 |
| 7,047,358 B2 | 5/2006 | Lee et al. | |
| 7,051,155 B2 ‡ | 5/2006 | Talagala | G06F 11/1076 711/11 |
| 7,055,058 B2 | 5/2006 | Lee et al. | |
| 7,065,617 B2 ‡ | 6/2006 | Wang | G06F 12/0269 707/99 |
| 7,069,383 B2 ‡ | 6/2006 | Yamamoto | G06F 3/0605 711/11 |
| 7,076,606 B2 ‡ | 7/2006 | Orsley | G06F 11/1076 707/99 |
| 7,107,480 B1 ‡ | 9/2006 | Moshayedi | G06F 11/1441 714/2 |
| 7,159,150 B2 ‡ | 1/2007 | Kenchammana-Hosekote | G06F 11/0727 714/4 |
| 7,162,575 B2 ‡ | 1/2007 | Dalal | G06F 3/0605 711/11 |
| 7,164,608 B2 ‡ | 1/2007 | Lee | G11C 14/00 365/18 |
| 7,188,270 B1 | 3/2007 | Nanda et al. | |
| 7,334,156 B2 ‡ | 2/2008 | Land | G06F 3/0607 714/6 |
| 7,370,220 B1 ‡ | 5/2008 | Nguyen | G06F 1/26 713/30 |
| 7,386,666 B1 | 6/2008 | Beauchamp et al. | |
| 7,398,285 B2 | 7/2008 | Kisley | |
| 7,424,498 B1 ‡ | 9/2008 | Patterson | G06F 12/0253 |
| 7,424,592 B1 ‡ | 9/2008 | Karr | G06F 3/0605 711/20 |
| 7,444,532 B2 ‡ | 10/2008 | Masuyama | G06F 1/26 713/30 |
| 7,480,658 B2 ‡ | 1/2009 | Heinla | H04L 29/06 |
| 7,484,056 B2 | 1/2009 | Madnani et al. | |
| 7,484,057 B1 | 1/2009 | Madnani et al. | |
| 7,484,059 B1 | 1/2009 | Ofer et al. | |
| 7,536,506 B2 ‡ | 5/2009 | Ashmore | G06F 1/3203 711/11 |
| 7,558,859 B2 ‡ | 7/2009 | Kasiolas | G06F 3/0605 358/1 |
| 7,565,446 B2 ‡ | 7/2009 | Talagala | H04L 67/1097 370/33 |
| 7,613,947 B1 ‡ | 11/2009 | Coatney | G06F 11/0727 714/6 |
| 7,634,617 B2 | 12/2009 | Misra | |
| 7,634,618 B2 | 12/2009 | Misra | |
| 7,681,104 B1 ‡ | 3/2010 | Sim-Tang | H04L 1/0057 714/76 |
| 7,681,105 B1 ‡ | 3/2010 | Sim-Tang | H03M 13/2909 714/76 |
| 7,681,109 B2 | 3/2010 | Yang et al. | |
| 7,730,257 B2 | 6/2010 | Franklin | |
| 7,730,258 B1 ‡ | 6/2010 | Smith | G06F 3/0622 711/11 |
| 7,730,274 B1 | 6/2010 | Usgaonkar | |
| 7,743,276 B2 ‡ | 6/2010 | Jacobson | G06F 11/1662 714/6 |
| 7,752,489 B2 | 7/2010 | Deenadhayalan et al. | |
| 7,757,038 B2 ‡ | 7/2010 | Kitahara | G11C 29/765 711/10 |
| 7,757,059 B1 | 7/2010 | Ofer et al. | |
| 7,778,960 B1 ‡ | 8/2010 | Chatterjee | G06F 16/214 707/60 |
| 7,783,955 B2 | 8/2010 | Haratsch | |
| 7,814,272 B2 ‡ | 10/2010 | Barrall | G06F 3/0607 711/11 |
| 7,814,273 B2 ‡ | 10/2010 | Barrall | G06F 3/0607 711/11 |
| 7,818,531 B2 ‡ | 10/2010 | Barrall | G06F 3/0607 711/17 |
| 7,827,351 B2 ‡ | 11/2010 | Suetsugu | G06F 11/1092 711/11 |
| 7,827,439 B2 ‡ | 11/2010 | Mathew | G06F 11/1076 714/5 |
| 7,831,768 B2 | 11/2010 | Ananthamurthy et al. | |
| 7,856,583 B1 | 12/2010 | Smith | |
| 7,870,105 B2 ‡ | 1/2011 | Arakawa | G06F 3/0605 707/69 |
| 7,873,878 B2 | 1/2011 | Belluomini et al. | |
| 7,885,938 B1 ‡ | 2/2011 | Greene | G06F 11/1469 707/67 |
| 7,886,111 B2 ‡ | 2/2011 | Klemm | G06F 3/0608 711/11 |
| 7,908,448 B1 ‡ | 3/2011 | Chatterjee | G06F 11/2064 707/65 |
| 7,916,538 B2 ‡ | 3/2011 | Jeon | G11C 11/005 365/13 |
| 7,921,268 B2 | 4/2011 | Jakob | |
| 7,930,499 B2 | 4/2011 | Duchesne | |
| 7,941,697 B2 ‡ | 5/2011 | Mathew | G06F 11/1092 714/6 |
| 7,958,303 B2 ‡ | 6/2011 | Shuster | G06F 3/0607 711/11 |
| 7,971,129 B2 ‡ | 6/2011 | Watson | H03M 13/03 365/20 |
| 7,984,016 B2 | 7/2011 | Kisley | |
| 7,991,822 B2 ‡ | 8/2011 | Bish | G06F 16/27 709/20 |
| 8,006,126 B2 | 8/2011 | Deenadhayalan et al. | |
| 8,010,485 B1 ‡ | 8/2011 | Chatterjee | G06F 3/061 707/60 |
| 8,010,829 B1 ‡ | 8/2011 | Chatterjee | G06F 11/2094 714/4 |

(56) References Cited

U.S. PATENT DOCUMENTS

| | | | |
|---|---|---|---|
| 8,020,047 B2 ‡ | 9/2011 | Courtney | G06F 11/008 711/15 |
| 8,046,548 B1 ‡ | 10/2011 | Chatterjee | G06F 11/2064 707/65 |
| 8,051,361 B2 ‡ | 11/2011 | Sim-Tang | H03M 13/2909 714/76 |
| 8,051,362 B2 ‡ | 11/2011 | Li | G06F 11/1076 714/75 |
| 8,074,038 B2 | 12/2011 | Lionetti et al. | |
| 8,082,393 B2 ‡ | 12/2011 | Galloway | G06F 11/1076 711/11 |
| 8,086,603 B2 | 12/2011 | Nasre et al. | |
| 8,086,634 B2 ‡ | 12/2011 | Mimatsu | H04L 67/06 707/78 |
| 8,086,911 B1 ‡ | 12/2011 | Taylor | G06F 11/106 711/11 |
| 8,090,837 B2 ‡ | 1/2012 | Shin | G06F 11/2089 709/22 |
| 8,108,502 B2 ‡ | 1/2012 | Tabbara | H04L 43/00 709/20 |
| 8,117,388 B2 ‡ | 2/2012 | Jernigan, IV | G06F 3/0608 711/11 |
| 8,117,521 B2 | 2/2012 | Yang et al. | |
| 8,140,821 B1 ‡ | 3/2012 | Raizen | G06F 11/1448 707/63 |
| 8,145,838 B1 ‡ | 3/2012 | Miller | G06F 11/2023 711/11 |
| 8,145,840 B2 ‡ | 3/2012 | Koul | G06F 11/1076 711/11 |
| 8,175,012 B2 | 5/2012 | Haratsch | |
| 8,176,360 B2 ‡ | 5/2012 | Frost | G06F 11/1044 714/6 |
| 8,176,405 B2 | 5/2012 | Hafner et al. | |
| 8,180,855 B2 ‡ | 5/2012 | Aiello | G06F 3/0607 709/21 |
| 8,200,922 B2 ‡ | 6/2012 | McKean | G06F 11/1466 711/16 |
| 8,209,469 B2 | 6/2012 | Carpenter et al. | |
| 8,225,006 B1 ‡ | 7/2012 | Karamcheti | G06F 11/108 710/5 |
| 8,239,618 B2 ‡ | 8/2012 | Kotzur | G06F 12/0246 711/10 |
| 8,244,999 B1 ‡ | 8/2012 | Chatterjee | G06F 11/2064 707/65 |
| 8,261,016 B1 | 9/2012 | Goel | |
| 8,271,455 B2 | 9/2012 | Kesselman | |
| 8,285,686 B2 | 10/2012 | Kesselman | |
| 8,305,811 B2 ‡ | 11/2012 | Jeon | G11C 16/20 365/18 |
| 8,315,999 B2 ‡ | 11/2012 | Chatley | H04L 67/1021 707/70 |
| 8,327,080 B1 ‡ | 12/2012 | Der | G06F 12/0804 711/14 |
| 8,335,769 B2 | 12/2012 | Kesselman | |
| 8,341,118 B2 | 12/2012 | Drobychev et al. | |
| 8,351,290 B1 ‡ | 1/2013 | Huang | G11C 16/349 365/21 |
| 8,364,920 B1 | 1/2013 | Parkison et al. | |
| 8,365,041 B2 | 1/2013 | Chu et al. | |
| 8,375,146 B2 ‡ | 2/2013 | Sinclair | G06F 13/42 709/22 |
| 8,397,016 B2 ‡ | 3/2013 | Talagala | G06F 12/02 711/10 |
| 8,402,152 B2 ‡ | 3/2013 | Duran | G06F 3/0616 709/20 |
| 8,412,880 B2 ‡ | 4/2013 | Leibowitz | G06F 3/0616 711/10 |
| 8,423,739 B2 ‡ | 4/2013 | Ash | G06F 3/0611 711/16 |
| 8,429,436 B2 ‡ | 4/2013 | Fillingim | G11C 5/141 711/10 |
| 8,452,928 B1 | 5/2013 | Ofer et al. | |
| 8,473,698 B2 | 6/2013 | Lionetti et al. | |
| 8,473,778 B2 ‡ | 6/2013 | Simitci | H03M 13/373 714/6 |
| 8,473,815 B2 | 6/2013 | Yu et al. | |
| 8,479,037 B1 ‡ | 7/2013 | Chatterjee | G06F 11/2094 714/4 |
| 8,484,414 B2 | 7/2013 | Sugimoto et al. | |
| 8,498,967 B1 ‡ | 7/2013 | Chatterjee | G06F 16/27 707/67 |
| 8,522,073 B2 ‡ | 8/2013 | Cohen | G06F 11/1662 714/4 |
| 8,533,408 B1 | 9/2013 | Madnani et al. | |
| 8,533,527 B2 | 9/2013 | Daikokuya | G06F 3/0607 714/6 |
| 8,539,177 B1 | 9/2013 | Ofer et al. | |
| 8,544,029 B2 ‡ | 9/2013 | Bakke | G06F 3/0611 710/22 |
| 8,549,224 B1 | 10/2013 | Zeryck et al. | |
| 8,583,861 B1 | 11/2013 | Ofer et al. | |
| 8,589,625 B2 ‡ | 11/2013 | Colgrove | G06F 3/061 711/11 |
| 8,595,455 B2 ‡ | 11/2013 | Chatterjee | G06F 11/2064 707/65 |
| 8,615,599 B1 ‡ | 12/2013 | Takefman | H04L 45/18 709/23 |
| 8,627,136 B2 ‡ | 1/2014 | Shankar | G06F 11/2028 709/21 |
| 8,627,138 B1 ‡ | 1/2014 | Clark | G06F 11/108 714/4 |
| 8,639,669 B1 | 1/2014 | Douglis et al. | |
| 8,639,863 B1 | 1/2014 | Kanapathippillai et al. | |
| 8,640,000 B1 | 1/2014 | Cypher | |
| 8,650,343 B1 | 2/2014 | Kanapathippillai et al. | |
| 8,660,131 B2 ‡ | 2/2014 | Vermunt | H04L 49/901 370/40 |
| 8,661,218 B1 ‡ | 2/2014 | Piszczek | G06F 11/108 711/10 |
| 8,671,072 B1 | 3/2014 | Shah et al. | |
| 8,689,042 B1 | 4/2014 | Kanapathippillai et al. | |
| 8,700,875 B1 ‡ | 4/2014 | Barron | G06F 3/0605 711/17 |
| 8,706,694 B2 ‡ | 4/2014 | Chatterjee | G06F 16/10 707/64 |
| 8,706,914 B2 ‡ | 4/2014 | Duchesneau | G06F 9/5072 709/20 |
| 8,706,932 B1 | 4/2014 | Kanapathippillai et al. | |
| 8,712,963 B1 | 4/2014 | Douglis et al. | |
| 8,713,405 B2 ‡ | 4/2014 | Healey, Jr. | G06F 3/0607 714/76 |
| 8,719,621 B1 | 5/2014 | Karmarkar | |
| 8,725,730 B2 ‡ | 5/2014 | Keeton | G06F 16/2462 707/73 |
| 8,751,859 B2 | 6/2014 | Becker-szendy et al. | |
| 8,756,387 B2 ‡ | 6/2014 | Frost | G06F 12/00 711/16 |
| 8,762,793 B2 ‡ | 6/2014 | Grube | G06F 3/0619 714/47 |
| 8,838,541 B2 | 6/2014 | Camble et al. | |
| 8,769,232 B2 | 7/2014 | Suryabudi et al. | |
| 8,775,858 B2 ‡ | 7/2014 | Gower | G06F 11/073 714/2 |
| 8,775,868 B2 ‡ | 7/2014 | Colgrove | G06F 3/0646 714/6 |
| 8,788,913 B1 ‡ | 7/2014 | Xin | H03M 13/373 714/77 |
| 8,793,447 B2 | 7/2014 | Usgaonkar et al. | |
| 8,799,746 B2 ‡ | 8/2014 | Baker | G06F 3/0683 714/76 |
| 8,819,311 B2 ‡ | 8/2014 | Liao | G06F 9/544 710/50 |
| 8,819,383 B1 ‡ | 8/2014 | Jobanputra | G06F 3/0613 711/15 |
| 8,824,261 B1 ‡ | 9/2014 | Miller | G11B 33/142 360/97 |
| 8,832,528 B2 | 9/2014 | Thatcher et al. | |
| 8,838,892 B2 | 9/2014 | Li | |

(56) References Cited

U.S. PATENT DOCUMENTS

| | | | |
|---|---|---|---|
| 8,843,700 B1 ‡ | 9/2014 | Salessi | G06F 11/1469 |
| | | | 711/10 |
| 8,850,108 B1 ‡ | 9/2014 | Hayes | G06F 3/067 |
| | | | 711/10 |
| 8,850,288 B1 ‡ | 9/2014 | Lazier | G06F 11/1048 |
| | | | 714/76 |
| 8,856,593 B2 ‡ | 10/2014 | Eckhardt | G06F 11/2028 |
| | | | 709/21 |
| 8,856,619 B1 ‡ | 10/2014 | Cypher | G06F 11/1044 |
| | | | 714/6 |
| 8,862,617 B2 | 10/2014 | Kesselman | |
| 8,862,847 B2 ‡ | 10/2014 | Feng | G06F 3/064 |
| | | | 711/11 |
| 8,862,928 B2 ‡ | 10/2014 | Xavier | G06F 11/2092 |
| | | | 714/4 |
| 8,868,825 B1 ‡ | 10/2014 | Hayes | G11C 16/16 |
| | | | 711/10 |
| 8,874,836 B1 ‡ | 10/2014 | Hayes | G06F 3/0659 |
| | | | 711/10 |
| 8,880,793 B2 | 11/2014 | Nagineni | |
| 8,880,825 B2 | 11/2014 | Lionetti et al. | |
| 8,886,778 B2 ‡ | 11/2014 | Nedved | G06F 11/1464 |
| | | | 709/22 |
| 8,898,383 B2 ‡ | 11/2014 | Yamamoto | G06F 3/0605 |
| | | | 711/11 |
| 8,898,388 B1 ‡ | 11/2014 | Kimmel | G06F 12/0802 |
| | | | 711/11 |
| 8,904,231 B2 ‡ | 12/2014 | Coatney | G06F 11/2023 |
| | | | 714/4 |
| 8,918,478 B2 ‡ | 12/2014 | Ozzie | G06F 11/1004 |
| | | | 709/21 |
| 8,930,307 B2 ‡ | 1/2015 | Colgrove | G06F 3/0608 |
| | | | 707/61 |
| 8,930,633 B2 ‡ | 1/2015 | Amit | G06F 9/5061 |
| | | | 711/14 |
| 8,943,357 B2 | 1/2015 | Atzmony | |
| 8,949,502 B2 ‡ | 2/2015 | McKnight | G06F 1/30 |
| | | | 710/22 |
| 8,959,110 B2 ‡ | 2/2015 | Smith | G06F 16/2471 |
| | | | 707/77 |
| 8,959,388 B1 | 2/2015 | Kuang et al. | |
| 8,972,478 B1 | 3/2015 | Storer et al. | |
| 8,972,779 B2 | 3/2015 | Lee et al. | |
| 8,977,597 B2 ‡ | 3/2015 | Ganesh | G06F 16/00 |
| | | | 707/67 |
| 8,996,828 B2 | 3/2015 | Kalos et al. | |
| 9,003,144 B1 ‡ | 4/2015 | Hayes | G06F 11/1092 |
| | | | 711/16 |
| 9,009,724 B2 ‡ | 4/2015 | Gold | G06F 3/0607 |
| | | | 718/1 |
| 9,021,053 B2 ‡ | 4/2015 | Bernbo | G06F 16/184 |
| | | | 709/21 |
| 9,021,215 B2 ‡ | 4/2015 | Meir | G06F 13/00 |
| | | | 711/15 |
| 9,025,393 B2 ‡ | 5/2015 | Wu | G11C 11/5642 |
| | | | 365/18 |
| 9,043,372 B2 ‡ | 5/2015 | Makkar | G06F 16/907 |
| | | | 707/82 |
| 9,047,214 B1 | 6/2015 | Sharon et al. | |
| 9,053,808 B2 ‡ | 6/2015 | Sprouse | G11B 20/1883 |
| 9,058,155 B2 ‡ | 6/2015 | Cepulis | G06F 1/183 |
| 9,063,895 B1 | 6/2015 | Madnani et al. | |
| 9,063,896 B1 | 6/2015 | Madnani et al. | |
| 9,098,211 B1 | 8/2015 | Madnani et al. | |
| 9,110,898 B1 | 8/2015 | Chamness et al. | |
| 9,110,964 B1 | 8/2015 | Shilane et al. | |
| 9,116,819 B2 ‡ | 8/2015 | Cope | G06F 12/0897 |
| 9,117,536 B2 ‡ | 8/2015 | Yoon | G11C 11/5642 |
| 9,122,401 B2 ‡ | 9/2015 | Zaltsman | G06F 3/061 |
| 9,123,422 B2 | 9/2015 | Sharon et al. | |
| 9,124,300 B2 | 9/2015 | Olbrich et al. | |
| 9,134,908 B2 ‡ | 9/2015 | Horn | G06F 3/0607 |
| 9,153,337 B2 ‡ | 10/2015 | Sutardja | G06F 12/0246 |
| 9,158,472 B2 | 10/2015 | Kesselman et al. | |
| 9,159,422 B1 | 10/2015 | Lee et al. | |
| 9,164,891 B2 | 10/2015 | Karamcheti et al. | |
| 9,183,136 B2 | 11/2015 | Kawamura et al. | |
| 9,189,650 B2 ‡ | 11/2015 | Jaye | G06F 21/6245 |
| 9,201,733 B2 ‡ | 12/2015 | Verma | G06F 11/1092 |
| 9,207,876 B2 ‡ | 12/2015 | Shu | G06F 3/0679 |
| 9,229,656 B1 | 1/2016 | Contreras et al. | |
| 9,229,810 B2 | 1/2016 | He et al. | |
| 9,235,475 B1 | 1/2016 | Shilane et al. | |
| 9,244,626 B2 | 1/2016 | Shah et al. | |
| 9,250,999 B1 | 2/2016 | Barroso | |
| 9,251,066 B2 ‡ | 2/2016 | Colgrove | G06F 3/0608 |
| 9,268,648 B1 | 2/2016 | Barash et al. | |
| 9,268,806 B1 | 2/2016 | Kesselman et al. | |
| 9,286,002 B1 | 3/2016 | Karamcheti et al. | |
| 9,292,214 B2 | 3/2016 | Kalos et al. | |
| 9,298,760 B1 | 3/2016 | Li et al. | |
| 9,304,908 B1 | 4/2016 | Karamcheti et al. | |
| 9,311,969 B2 | 4/2016 | Murin | |
| 9,311,970 B2 | 4/2016 | Sharon et al. | |
| 9,323,663 B2 | 4/2016 | Karamcheti et al. | |
| 9,323,667 B2 ‡ | 4/2016 | Bennett | G06F 12/0292 |
| 9,323,681 B2 ‡ | 4/2016 | Apostolides | G06F 12/0815 |
| 9,335,942 B2 | 5/2016 | Kumar et al. | |
| 9,348,538 B2 ‡ | 5/2016 | Mallaiah | G06F 16/1748 |
| 9,355,022 B2 | 5/2016 | Ravimohan et al. | |
| 9,384,082 B1 ‡ | 7/2016 | Lee | G06F 11/0793 |
| 9,384,252 B2 | 7/2016 | Akirav et al. | |
| 9,389,958 B2 | 7/2016 | Sundaram et al. | |
| 9,390,019 B2 ‡ | 7/2016 | Patterson | G06F 12/0866 |
| 9,396,202 B1 | 7/2016 | Drobychev et al. | |
| 9,400,828 B2 | 7/2016 | Kesselman et al. | |
| 9,405,478 B2 ‡ | 8/2016 | Koseki | G06F 3/0616 |
| 9,411,685 B2 | 8/2016 | Lee | |
| 9,417,960 B2 | 8/2016 | Klein | |
| 9,417,963 B2 | 8/2016 | He et al. | |
| 9,430,250 B2 | 8/2016 | Hamid et al. | |
| 9,430,542 B2 | 8/2016 | Akirav et al. | |
| 9,432,541 B2 ‡ | 8/2016 | Ishida | H04N 1/0083 |
| 9,454,434 B2 | 9/2016 | Sundaram et al. | |
| 9,471,579 B1 | 10/2016 | Natanzon | |
| 9,477,554 B2 | 10/2016 | Chamness et al. | |
| 9,477,632 B2 ‡ | 10/2016 | Du | G06F 13/385 |
| 9,501,398 B2 | 11/2016 | George et al. | |
| 9,525,737 B2 | 12/2016 | Friedman | |
| 9,529,542 B2 | 12/2016 | Friedman et al. | |
| 9,535,631 B2 | 1/2017 | Fu et al. | |
| 9,552,248 B2 | 1/2017 | Miller et al. | |
| 9,552,291 B2 | 1/2017 | Munetoh et al. | |
| 9,552,299 B2 ‡ | 1/2017 | Stalzer | G06F 12/0866 |
| 9,563,517 B1 | 2/2017 | Natanzon et al. | |
| 9,588,698 B1 | 3/2017 | Karamcheti et al. | |
| 9,588,712 B2 | 3/2017 | Kalos et al. | |
| 9,594,652 B1 | 3/2017 | Sathiamoorthy et al. | |
| 9,600,193 B2 | 3/2017 | Ahrens et al. | |
| 9,619,321 B1 | 4/2017 | Sharon et al. | |
| 9,619,430 B2 | 4/2017 | Kannan et al. | |
| 9,645,754 B2 | 5/2017 | Li et al. | |
| 9,667,720 B1 | 5/2017 | Bent et al. | |
| 9,710,535 B2 | 7/2017 | Aizman et al. | |
| 9,733,840 B2 | 8/2017 | Karamcheti et al. | |
| 9,734,225 B2 | 8/2017 | Akirav et al. | |
| 9,740,403 B2 | 8/2017 | Storer et al. | |
| 9,740,700 B1 | 8/2017 | Chopra et al. | |
| 9,740,762 B2 | 8/2017 | Horowitz et al. | |
| 9,747,319 B2 | 8/2017 | Bestler et al. | |
| 9,747,320 B2 | 8/2017 | Kesselman | |
| 9,767,130 B2 | 9/2017 | Bestler et al. | |
| 9,781,227 B2 | 10/2017 | Friedman et al. | |
| 9,785,498 B2 | 10/2017 | Misra et al. | |
| 9,798,486 B1 | 10/2017 | Singh | |
| 9,804,925 B1 | 10/2017 | Carmi et al. | |
| 9,811,285 B1 | 11/2017 | Karamcheti et al. | |
| 9,811,546 B1 | 11/2017 | Bent et al. | |
| 9,818,478 B2 ‡ | 11/2017 | Chung | G11C 13/0004 |
| 9,829,066 B2 ‡ | 11/2017 | Thomas | F16G 1/10 |
| 9,836,245 B2 | 12/2017 | Hayes et al. | |
| 9,891,854 B2 | 2/2018 | Munetoh et al. | |

(56) References Cited

U.S. PATENT DOCUMENTS

| | | | |
|---|---|---|---|
| 9,891,860 B1 | 2/2018 | Delgado et al. | |
| 9,892,005 B2 | 2/2018 | Kedem et al. | |
| 9,892,186 B2 | 2/2018 | Akirav et al. | |
| 9,904,589 B1 | 2/2018 | Donlan et al. | |
| 9,904,717 B2 | 2/2018 | Anglin et al. | |
| 9,952,809 B2 | 2/2018 | Shah | |
| 9,910,748 B2 | 3/2018 | Pan | |
| 9,910,904 B2 | 3/2018 | Anglin et al. | |
| 9,934,237 B1 | 4/2018 | Shilane et al. | |
| 9,940,065 B2 | 4/2018 | Kalos et al. | |
| 9,946,604 B1 | 4/2018 | Glass | |
| 9,959,167 B1 | 5/2018 | Donlan et al. | |
| 9,965,539 B2 | 5/2018 | D'halluin et al. | |
| 1,000,745 A1 | 6/2018 | Hayes et al. | |
| 9,998,539 B1 | 6/2018 | Brock et al. | |
| 1,001,331 A1 | 7/2018 | Sundaram et al. | |
| 1,001,931 A1 | 7/2018 | Usvyatsky et al. | |
| 1,003,170 A1 | 7/2018 | Natanzon et al. | |
| 1,006,151 A1 | 8/2018 | Chu et al. | |
| 1,007,362 A1 | 9/2018 | Karamcheti et al. | |
| 1,008,298 A1 | 9/2018 | Hayes et al. | |
| 1,008,901 A1 | 10/2018 | Chen et al. | |
| 1,008,917 A1 | 10/2018 | Lin | |
| 1,010,881 A1 | 10/2018 | Donlan et al. | |
| 1,014,678 A1 | 12/2018 | Bashyam et al. | |
| 1,015,226 A1 | 12/2018 | Chakraborty et al. | |
| 1,015,709 A1 | 12/2018 | Chung et al. | |
| 1,016,270 A1 | 12/2018 | Kirschner et al. | |
| 1,018,087 A1 | 1/2019 | Northcott | |
| 1,018,573 A1 | 1/2019 | Bestler et al. | |
| 1,023,506 A1 | 3/2019 | Miller et al. | |
| 2002/0144059 A1‡ | 10/2002 | Kendall | G06F 12/0246 |
| 2003/0105984 A1‡ | 6/2003 | Masuyama | G06F 1/26 713/33 |
| 2003/0110205 A1‡ | 6/2003 | Johnson | G06F 9/5016 718/10 |
| 2004/0161086 A1‡ | 8/2004 | Buntin | H04L 12/4633 379/18 |
| 2005/0001652 A1‡ | 1/2005 | Malik | H04Q 9/00 326/38 |
| 2005/0076228 A1‡ | 4/2005 | Davis | G06F 21/72 713/18 |
| 2005/0235132 A1‡ | 10/2005 | Karr | G06F 3/0607 711/20 |
| 2005/0278460 A1‡ | 12/2005 | Shin | G06F 9/5011 710/1 |
| 2005/0281105 A1* | 12/2005 | Oshima | G06F 12/0292 365/200 |
| 2005/0283649 A1‡ | 12/2005 | Turner | H04L 67/1095 714/6 |
| 2006/0015683 A1‡ | 1/2006 | Ashmore | G06F 1/3203 711/11 |
| 2006/0114930 A1‡ | 6/2006 | Lucas | G06F 11/006 370/46 |
| 2006/0174157 A1‡ | 8/2006 | Barrall | G06F 3/0607 714/6 |
| 2006/0248294 A1‡ | 11/2006 | Nedved | G06F 11/1464 711/16 |
| 2007/0079068 A1‡ | 4/2007 | Draggon | G06F 11/1076 711/11 |
| 2007/0214194 A1‡ | 9/2007 | Reuter | G06F 16/10 |
| 2007/0214314 A1‡ | 9/2007 | Reuter | G06F 3/0607 711/11 |
| 2007/0234016 A1‡ | 10/2007 | Davis | G06F 9/3802 712/22 |
| 2007/0268905 A1‡ | 11/2007 | Baker | H04L 1/0052 370/39 |
| 2008/0080709 A1‡ | 4/2008 | Michtchenko | H04L 9/0618 380/44 |
| 2008/0107274 A1‡ | 5/2008 | Worthy | G06F 21/602 380/27 |
| 2008/0155191 A1‡ | 6/2008 | Anderson | G06F 11/1076 711/11 |
| 2008/0295118 A1‡ | 11/2008 | Liao | G06F 9/544 719/32 |
| 2009/0077208 A1‡ | 3/2009 | Nguyen | H04L 29/12839 709/22 |
| 2009/0138654 A1‡ | 5/2009 | Sutardja | G06F 12/0246 711/10 |
| 2009/0216910 A1‡ | 8/2009 | Duchesneau | G06F 9/5072 709/25 |
| 2009/0216920 A1‡ | 8/2009 | Lauterbach | H04L 49/351 710/36 |
| 2010/0017444 A1‡ | 1/2010 | Chatterjee | G06F 16/10 |
| 2010/0042636 A1‡ | 2/2010 | Lu | G06F 9/5077 709/20 |
| 2010/0094806 A1‡ | 4/2010 | Apostolides | G06F 12/0815 707/63 |
| 2010/0115070 A1‡ | 5/2010 | Missimilly | H04L 29/12216 709/22 |
| 2010/0125695 A1‡ | 5/2010 | Wu | G06F 3/0613 711/10 |
| 2010/0162076 A1‡ | 6/2010 | Sim-Tang | H03M 13/2909 714/75 |
| 2010/0169707 A1‡ | 7/2010 | Mathew | G06F 11/1092 714/6 |
| 2010/0174576 A1‡ | 7/2010 | Naylor | G06Q 10/04 701/31 |
| 2010/0268908 A1‡ | 10/2010 | Ouyang | G06F 11/2094 711/17 |
| 2011/0040925 A1‡ | 2/2011 | Frost | G06F 11/1044 711/10 |
| 2011/0060927 A1‡ | 3/2011 | Fillingim | G11C 5/141 713/32 |
| 2011/0119462 A1‡ | 5/2011 | Leach | G06F 12/0246 711/16 |
| 2011/0219170 A1‡ | 9/2011 | Frost | G06F 12/00 711/10 |
| 2011/0238625 A1‡ | 9/2011 | Hamaguchi | G06F 11/1464 707/64 |
| 2011/0264843 A1‡ | 10/2011 | Haines | G06F 3/0629 711/10 |
| 2011/0296133 A1* | 12/2011 | Flynn | G06F 3/0619 711/171 |
| 2011/0302369 A1‡ | 12/2011 | Goto | G06F 11/1096 711/11 |
| 2012/0011398 A1‡ | 1/2012 | Eckhardt | G06F 11/2028 714/15 |
| 2012/0079318 A1‡ | 3/2012 | Colgrove | G06F 3/0689 714/6 |
| 2012/0089567 A1 | 4/2012 | Takahashi et al. | |
| 2012/0110249 A1‡ | 5/2012 | Jeong | G06F 3/0679 711/10 |
| 2012/0131253 A1‡ | 5/2012 | McKnight | G06F 1/30 710/30 |
| 2012/0158923 A1‡ | 6/2012 | Mohamed | G06F 9/5077 709/22 |
| 2012/0191900 A1‡ | 7/2012 | Kunimatsu | G06F 3/0631 711/10 |
| 2012/0198152 A1‡ | 8/2012 | Terry | G06F 11/2094 711/11 |
| 2012/0198261 A1‡ | 8/2012 | Brown | G06F 1/26 713/33 |
| 2012/0209943 A1‡ | 8/2012 | Jung | G06F 15/161 709/21 |
| 2012/0226934 A1‡ | 9/2012 | Rao | G06F 11/1068 714/6 |
| 2012/0246435 A1‡ | 9/2012 | Meir | G06F 13/00 711/16 |
| 2012/0260055 A1‡ | 10/2012 | Murase | G06F 3/0608 711/16 |
| 2012/0311557 A1‡ | 12/2012 | Resch | H04L 9/0861 717/17 |
| 2013/0022201 A1‡ | 1/2013 | Glew | G06F 21/72 380/26 |
| 2013/0036314 A1‡ | 2/2013 | Glew | G06F 12/1408 713/19 |
| 2013/0042056 A1‡ | 2/2013 | Shats | G06F 12/0246 711/10 |

(56) References Cited

U.S. PATENT DOCUMENTS

| | | | |
|---|---|---|---|
| 2013/0060884 A1‡ | 3/2013 | Bernbo | G06F 16/184 709/21 |
| 2013/0067188 A1‡ | 3/2013 | Mehra | G06F 3/0605 711/17 |
| 2013/0073894 A1‡ | 3/2013 | Xavier | G06F 11/2092 714/4 |
| 2013/0124776 A1‡ | 5/2013 | Hallak | G06F 11/1092 711/10 |
| 2013/0132800 A1‡ | 5/2013 | Healey, Jr. | G06F 3/0607 714/76 |
| 2013/0151653 A1‡ | 6/2013 | Sawicki | G06F 15/17331 709/21 |
| 2013/0151771 A1‡ | 6/2013 | Tsukahara | G06F 12/0804 711/11 |
| 2013/0173853 A1‡ | 7/2013 | Ungureanu | G06F 12/124 711/10 |
| 2013/0238554 A1‡ | 9/2013 | Yucel | G06F 11/1415 707/61 |
| 2013/0339314 A1‡ | 12/2013 | Carpentier | G06F 3/0641 707/69 |
| 2013/0339635 A1‡ | 12/2013 | Amit | G06F 9/5061 711/15 |
| 2013/0339818 A1‡ | 12/2013 | Baker | G06F 3/0667 714/76 |
| 2014/0040535 A1‡ | 2/2014 | Lee | G06F 12/0246 711/10 |
| 2014/0040702 A1‡ | 2/2014 | He | G06F 11/1076 714/76 |
| 2014/0047263 A1‡ | 2/2014 | Coatney | G06F 11/2023 714/4 |
| 2014/0047269 A1‡ | 2/2014 | Kim | G06F 11/1402 714/16 |
| 2014/0063721 A1‡ | 3/2014 | Herman | G06F 1/20 361/67 |
| 2014/0064048 A1‡ | 3/2014 | Cohen | G06F 3/0613 369/47 |
| 2014/0068224 A1‡ | 3/2014 | Fan | G06F 3/0613 711/20 |
| 2014/0075252 A1‡ | 3/2014 | Luo | G11C 11/5635 714/72 |
| 2014/0122510 A1 | 5/2014 | Namkoong et al. | |
| 2014/0136880 A1‡ | 5/2014 | Shankar | G06F 11/2028 714/4 |
| 2014/0181402 A1‡ | 6/2014 | White | G06F 12/0897 711/12 |
| 2014/0237164 A1‡ | 8/2014 | Le | G06F 12/0246 711/10 |
| 2014/0279936 A1‡ | 9/2014 | Bernbo | G06F 16/24 707/68 |
| 2014/0280025 A1‡ | 9/2014 | Eidson | G06F 16/24544 707/71 |
| 2014/0289588 A1‡ | 9/2014 | Nagadomi | G06F 12/0246 714/76 |
| 2014/0317479 A1‡ | 10/2014 | Candelaria | G06F 11/1004 714/807 |
| 2014/0330785 A1 | 11/2014 | Isherwood et al. | |
| 2014/0372838 A1 | 12/2014 | Lou et al. | |
| 2014/0380125 A1‡ | 12/2014 | Calder | G06F 11/10 714/76 |
| 2014/0380126 A1‡ | 12/2014 | Yekhanin | G06F 11/10 714/76 |
| 2015/0032720 A1‡ | 1/2015 | James | G06F 16/21 707/71 |
| 2015/0039645 A1‡ | 2/2015 | Lewis | G06F 16/9014 707/76 |
| 2015/0039849 A1‡ | 2/2015 | Lewis | G06F 12/109 711/20 |
| 2015/0089283 A1‡ | 3/2015 | Kermarrec | G06F 3/0619 714/6 |
| 2015/0100746 A1‡ | 4/2015 | Rychlik | G06F 12/0607 711/15 |
| 2015/0134824 A1‡ | 5/2015 | Mickens | H04L 47/70 709/22 |
| 2015/0153800 A1‡ | 6/2015 | Lucas | G06F 1/263 713/30 |
| 2015/0180714 A1‡ | 6/2015 | Chunn | H04L 67/1097 709/22 |
| 2015/0280959 A1‡ | 10/2015 | Vincent | G06F 3/0622 709/20 |
| 2016/0246537 A1 | 2/2016 | Kim | |
| 2016/0191508 A1 | 6/2016 | Bestler et al. | |
| 2016/0378612 A1 | 12/2016 | Hipsh et al. | |
| 2017/0091236 A1 | 3/2017 | Hayes et al. | |
| 2017/0103092 A1 | 4/2017 | Hu et al. | |
| 2017/0103094 A1 | 4/2017 | Hu et al. | |
| 2017/0103098 A1 | 4/2017 | Hu et al. | |
| 2017/0103116 A1 | 4/2017 | Hu et al. | |
| 2017/0177236 A1 | 6/2017 | Cai et al. | |
| 2018/0039442 A1 | 2/2018 | Shadrin et al. | |
| 2018/0081958 A1 | 3/2018 | Akirav et al. | |
| 2018/0101441 A1 | 4/2018 | Hyun et al. | |
| 2018/0101587 A1 | 4/2018 | Anglin et al. | |
| 2018/0101588 A1 | 4/2018 | Anglin et al. | |
| 2018/0217756 A1 | 8/2018 | Liu et al. | |
| 2018/0307560 A1 | 10/2018 | Vishnumolakala et al. | |
| 2018/0321874 A1 | 11/2018 | Li et al. | |
| 2019/0036703 A1 | 1/2019 | Bestler | |

FOREIGN PATENT DOCUMENTS

| | | | |
|---|---|---|---|
| WO | WO 02-13033 | ‡ | 2/2002 |
| WO | WO 2008103569 | ‡ | 8/2008 |
| WO | WO 2008157081 | ‡ | 12/2008 |
| WO | WO 2013032825 | ‡ | 7/2013 |

OTHER PUBLICATIONS

International Search Report, PCT/US2016/014357, dated Jun. 29, 2016.‡

International Seach Report and the Written Opinion of the International Searching Authority, PCT/US2016/016504, dated Jul. 6, 2016.‡

International Search Report, PCT/US2016/014604, dated May 19, 2016.‡

International Search Report, PCT/US2016/014361, dated May 30, 2016.‡

International Search Report amd the Written Opinion of the International Searching Authority, PCT/US2016/031039, dated May 5, 2016.‡

International Seach Report and the Written Opinion of the International Searching Authority, PCT/US2016/033306, dated Aug. 19, 2016.‡

International Seach Report and the Written Opinion of the International Searching Authority, PCT/US2016/047808, dated Nov. 25, 2016.‡

Stalzer, Mark A., "FlashBlades: System Architecture and Applications," Proceedings of the 2nd Workshop on Architectures and Systems for Big Data, Association for Computing Machinery, New York, NY, 2012, pp. 10-14.‡

International Seach Report and the Written Opinion of the International Searching Authority, PCT/US2016/042147, dated Nov. 30, 2016.‡

International Seach Report and the Written Opinion of the International Searching Authority, PCT/US2016/026529, dated Jul. 19, 2016.‡

International Seach Report and the Written Opinion of the International Searching Authority, PCT/US2016/023485, dated Jul. 21, 2016.‡

International Seach Report and the Written Opinion of the International Searching Authority, PCT/US2016/024391, dated Jul. 12, 2016.‡

International Search Report and the Written Opinion of the International Searching Authority, PCT/US2015/039136, dated Sep. 23, 2015.‡

International Search Report, PCT/US2015/039142, dated Sep. 24, 2015.‡

(56) References Cited

OTHER PUBLICATIONS

International Search Report and the Written Opinion of the International Searching Authority, PCT/US2015/039135, dated Sep. 18, 2015.‡

International Search Report and the Written Opinion of the International Searching Authority, PCT/US2015/039137, dated Oct. 1, 2015.‡

International Search Report, PCT/US2015/044370, dated Dec. 15, 2015.‡

International Search Report, PCT/US2015/034291, dated Sep. 30, 2015.‡

Ju-Kyeong Kim et al., "Data Access Frequency based Data Replication Method using Erasure Codes in Cloud Storage System", Journal of the Institute of Electronics and Information Engineers, Feb. 2014, vol. 51, No. 2, pp. 85-91.‡

International Search Report and the Written Opinion of the International Searching Authority, PCT/US2015/018169, dated May 15, 2015.‡

International Search Report and the Written Opinion of the International Searching Authority, PCT/US2015/034302, dated Sep. 11, 2015.‡

Schmid, Patrick: "RAID Scaling Charts, Part 3:4-128 kB Stripes Compared", Tom's Hardware, Nov. 27, 2007 (http://www.tomshardware.com/reviews/RAID-SCALING-CHARTS.1735-4.html), See pp. 1-2.‡

Storer, Mark W. et al., "Pergamum: Replacing Tape with Energy Efficient, Reliable, Disk- Based Archival Storage," Fast '08: 6th USENIX Conference on File and Storage Technologies, San Jose, CA, Feb. 26-29, 2008 pp. 1-16.‡

Hwang, Kai, et al. "RAID-x: A New Distributed Disk Array for I/O-Centric Cluster Computing," HPDC '00 Proceedings of the 9th IEEE International Symposium on High Performance Distributed Computing, IEEE, 2000, pp. 279-286.‡

Hwang, Kai, et al. "RAID-x: A New Distributed Disk Array for I/O-Centric Cluster Computing," HPDC '00 Proceedings of the 9th IEEE International Symposium on High Performance Distributed Computing, IEEE, 2000, pp. 279-286.

International Seach Report and the Written Opinion of the International Searching Authority, PCT/US2016/026529, dated Jul. 19, 2016.

\* cited by examiner
‡ imported from a related application

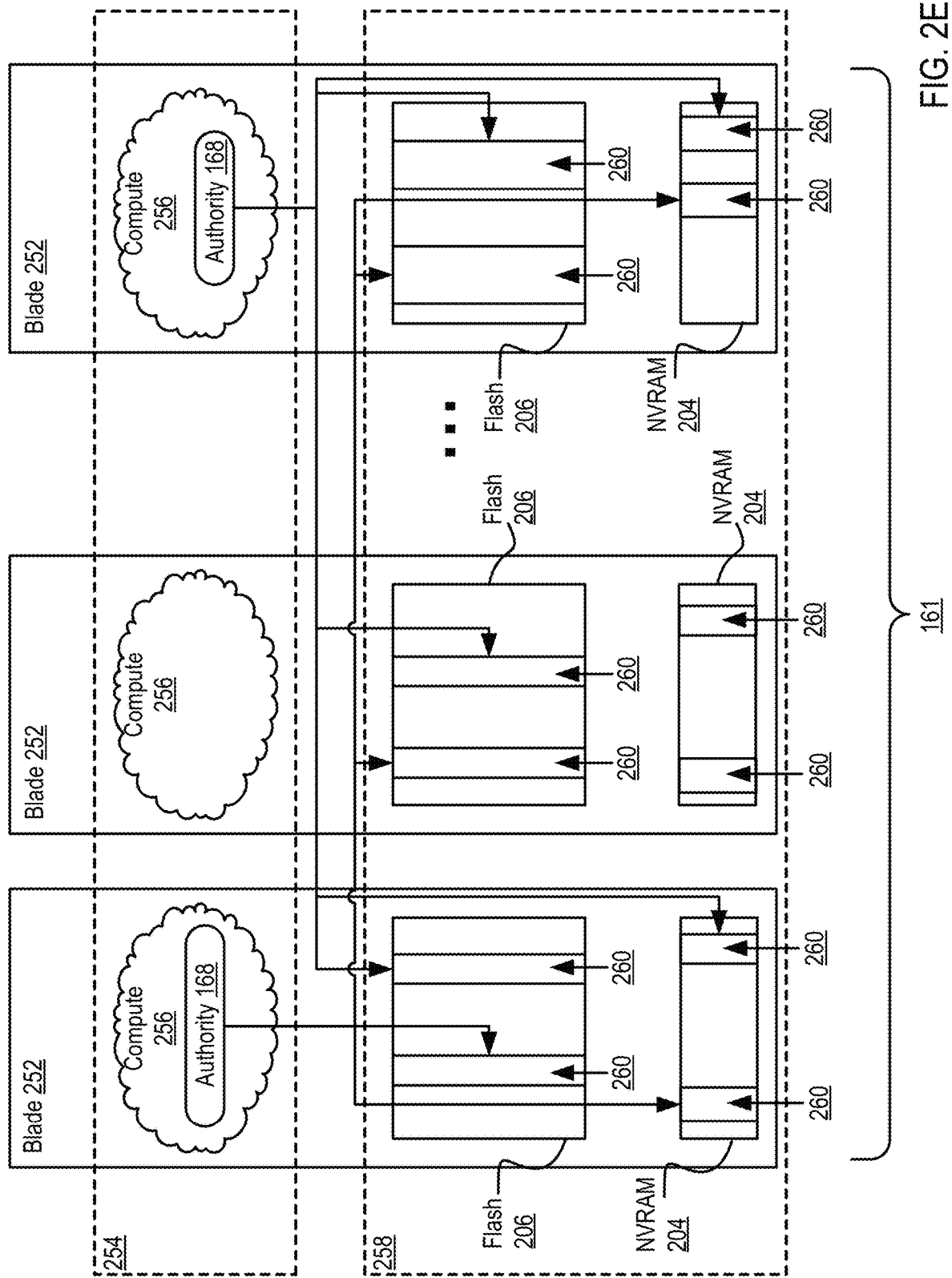

DATA REBUILD WITH CHANGING ERASE BLOCK SIZES

BACKGROUND

Flash storage devices use different sized erase blocks (that is, the size of data that can be erased and is written to), depending on the underlying flash technology (SLC or single level cell, MLC or multilevel cell, QLC or quad level cell, etc.). Furthermore, it is likely that the sizes of these blocks will not always be common divisors of each other; for example, upcoming flash memory may have block sizes of 24 MB and 64 MB. One challenge arises when it becomes necessary to replace a failed drive that has one erase block size (e.g. a 64 MB erase block) with a new drive that has a different erase block size (e.g. 24 MB). There are at least two problems to solve. First, upon identifying the replacement erase blocks; while the first replacement erase block in a group of replacement erase blocks will start with the same data as the failed block, any additional replacement erase blocks will start with data from the middle of the failed block. This is an issue for systems that represent the liveness of a block with data (e.g., metadata) written at the start of the block. Second, if the set of replacement blocks has more capacity than the original failed block, there is wastage of physical memory space, which goes unutilized. Therefore, there is a need in the art for a solution which overcomes the drawbacks described above.

SUMMARY

A method for rebuilding data when changing erase block sizes in a storage system is provided. The method includes determining one or more erase blocks to be rebuilt and allocating one or more replacement erase blocks, wherein the one or more erase blocks and the one or more replacement erase blocks have differing erase block sizes. The method includes mapping logical addresses, for the one or more erase blocks, to the one or more replacement erase blocks and rebuilding the one or more erase blocks into the one or more replacement erase blocks, in accordance with the mapping.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

The present disclosure is illustrated by way of example, and not by way of limitation, and can be more fully understood with reference to the following detailed description when considered in connection with the figures as described below.

FIG. 2E is a blade hardware block diagram, showing a control plane, compute and storage planes, and authorities interacting with underlying physical resources, in accordance with some embodiments.

DETAILED DESCRIPTION

Embodiments of storage systems that can rebuild data, for example in cases of failure, replacement or upgrade of part of a storage memory, are described herein. Various embodiments are designed to function with multiple erase block sizes in flash memory, and can rebuild data from one or more erase blocks to be rebuilt into one or more replacement erase blocks even though the erase block sizes are different from the erase block(s) from which the data originated.

Figure 1A:
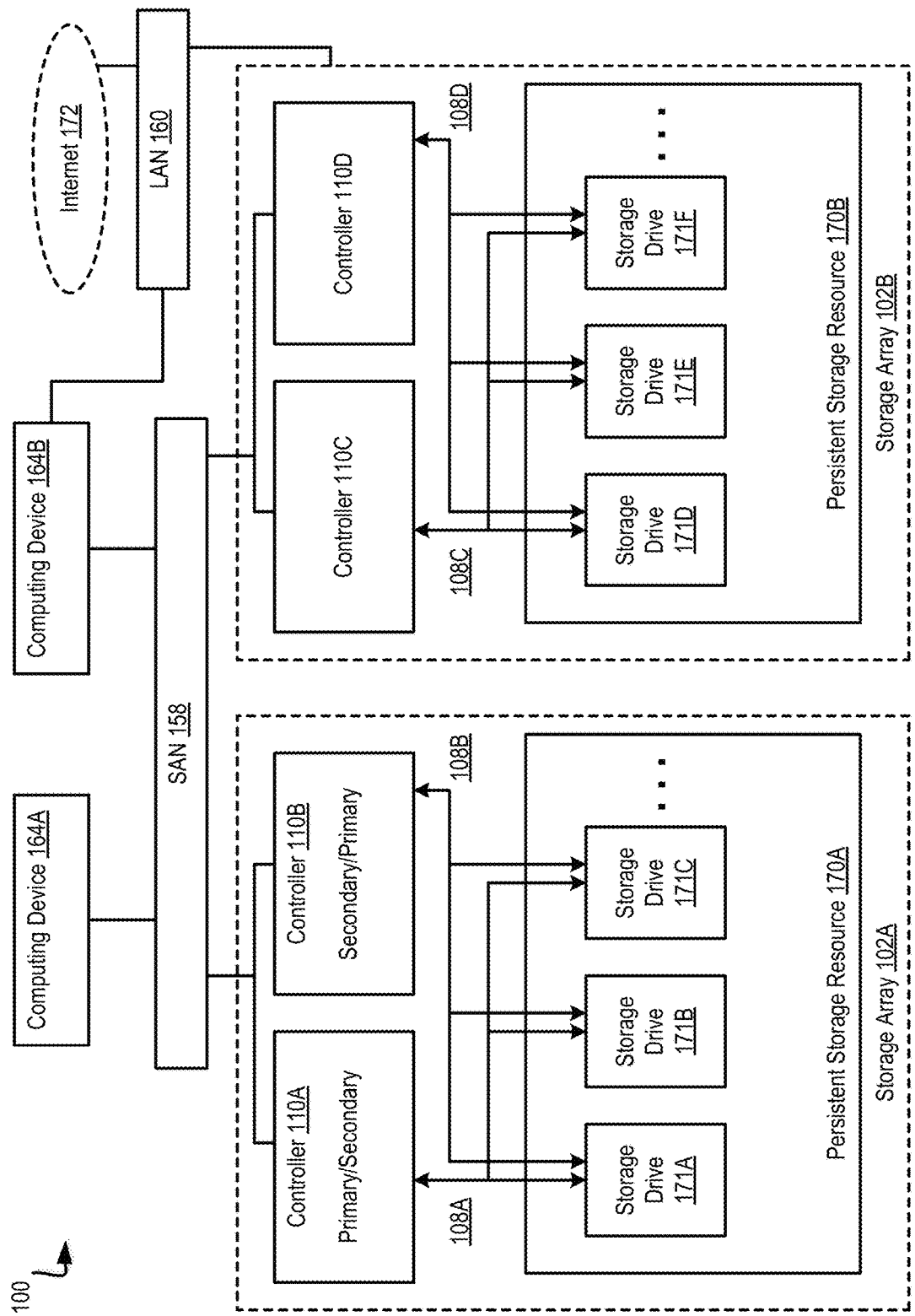
FIG. 1A illustrates a first example system for data storage in accordance with some implementations.

FIG. 1A illustrates an example system for data storage, in accordance with some implementations. System 100 (also referred to as "storage system" herein) includes numerous elements for purposes of illustration rather than limitation. It may be noted that system 100 may include the same, more, or fewer elements configured in the same or different manner in other implementations.

System 100 includes a number of computing devices 164. Computing devices (also referred to as "client devices" herein) may be for example, a server in a data center, a workstation, a personal computer, a notebook, or the like. Computing devices 164 are coupled for data communications to one or more storage arrays 102 through a storage area network (SAN) 158 or a local area network (LAN) 160.

The SAN 158 may be implemented with a variety of data communications fabrics, devices, and protocols. For example, the fabrics for SAN 158 may include Fibre Channel, Ethernet, Infiniband, Serial Attached Small Computer System Interface (SAS), or the like. Data communications protocols for use with SAN 158 may include Advanced Technology Attachment (ATA), Fibre Channel Protocol, Small Computer System Interface (SCSI), Internet Small Computer System Interface (iSCSI), HyperSCSI, Non-Volatile Memory Express (NVMe) over Fabrics, or the like. It may be noted that SAN 158 is provided for illustration, rather than limitation. Other data communication couplings may be implemented between computing devices 164 and storage arrays 102.

The LAN 160 may also be implemented with a variety of fabrics, devices, and protocols. For example, the fabrics for LAN 160 may include Ethernet (802.3), wireless (802.11), or the like. Data communication protocols for use in LAN 160 may include Transmission Control Protocol (TCP), User Datagram Protocol (UDP), Internet Protocol (IP), HyperText Transfer Protocol (HTTP), Wireless Access Protocol (WAP), Handheld Device Transport Protocol (HDTP), Session Initiation Protocol (SIP), Real Time Protocol (RTP), or the like.

Storage arrays 102 may provide persistent data storage for the computing devices 164. Storage array 102A may be contained in a chassis (not shown), and storage array 102B may be contained in another chassis (not shown), in implementations. Storage array 102A and 102B may include one or more storage array controllers 110 (also referred to as "controller" herein). A storage array controller 110 may be embodied as a module of automated computing machinery comprising computer hardware, computer software, or a combination of computer hardware and software. In some implementations, the storage array controllers 110 may be configured to carry out various storage tasks. Storage tasks may include writing data received from the computing devices 164 to storage array 102, erasing data from storage array 102, retrieving data from storage array 102 and providing data to computing devices 164, monitoring and reporting of disk utilization and performance, performing redundancy operations, such as Redundant Array of Independent Drives (RAID) or RAID-like data redundancy operations, compressing data, encrypting data, and so forth.

Storage array controller 110 may be implemented in a variety of ways, including as a Field Programmable Gate Array (FPGA), a Programmable Logic Chip (PLC), an Application Specific Integrated Circuit (ASIC), System-on-Chip (SOC), or any computing device that includes discrete components such as a processing device, central processing unit, computer memory, or various adapters. Storage array controller 110 may include, for example, a data communications adapter configured to support communications via the SAN 158 or LAN 160. In some implementations, storage array controller 110 may be independently coupled to the LAN 160. In implementations, storage array controller 110 may include an I/O controller or the like that couples the storage array controller 110 for data communications, through a midplane (not shown), to a persistent storage resource 170 (also referred to as a "storage resource" herein). The persistent storage resource 170 main include any number of storage drives 171 (also referred to as "storage devices" herein) and any number of non-volatile Random Access Memory (NVRAM) devices (not shown).

In some implementations, the NVRAM devices of a persistent storage resource 170 may be configured to receive, from the storage array controller 110, data to be stored in the storage drives 171. In some examples, the data may originate from computing devices 164. In some examples, writing data to the NVRAM device may be carried out more quickly than directly writing data to the storage drive 171. In implementations, the storage array controller 110 may be configured to utilize the NVRAM devices as a quickly accessible buffer for data destined to be written to the storage drives 171. Latency for write requests using NVRAM devices as a buffer may be improved relative to a system in which a storage array controller 110 writes data directly to the storage drives 171. In some implementations, the NVRAM devices may be implemented with computer memory in the form of high bandwidth, low latency RAM. The NVRAM device is referred to as "non-volatile" because the NVRAM device may receive or include a unique power source that maintains the state of the RAM after main power loss to the NVRAM device. Such a power source may be a battery, one or more capacitors, or the like. In response to a power loss, the NVRAM device may be configured to write the contents of the RAM to a persistent storage, such as the storage drives 171.

In implementations, storage drive 171 may refer to any device configured to record data persistently, where "persistently" or "persistent" refers as to a device's ability to maintain recorded data after loss of power. In some implementations, storage drive 171 may correspond to non-disk storage media. For example, the storage drive 171 may be one or more solid-state drives (SSDs), flash memory based storage, any type of solid-state non-volatile memory, or any other type of non-mechanical storage device. In other implementations, storage drive 171 may include may include mechanical or spinning hard disk, such as hard-disk drives (HDD).

In some implementations, the storage array controllers 110 may be configured for offloading device management responsibilities from storage drive 171 in storage array 102. For example, storage array controllers 110 may manage control information that may describe the state of one or more memory blocks in the storage drives 171. The control information may indicate, for example, that a particular memory block has failed and should no longer be written to, that a particular memory block contains boot code for a storage array controller 110, the number of program-erase (P/E) cycles that have been performed on a particular memory block, the age of data stored in a particular memory block, the type of data that is stored in a particular memory block, and so forth. In some implementations, the control information may be stored with an associated memory block as metadata. In other implementations, the control information for the storage drives 171 may be stored in one or more particular memory blocks of the storage drives 171 that are selected by the storage array controller 110. The selected memory blocks may be tagged with an identifier indicating that the selected memory block contains control information. The identifier may be utilized by the storage array controllers 110 in conjunction with storage drives 171 to quickly identify the memory blocks that contain control information. For example, the storage controllers 110 may issue a command to locate memory blocks that contain control information. It may be noted that control information may be so large that parts of the control information may be stored in multiple locations, that the control information may be stored in multiple locations for purposes of redundancy, for example, or that the control information may otherwise be distributed across multiple memory blocks in the storage drive 171.

In implementations, storage array controllers 110 may offload device management responsibilities from storage drives 171 of storage array 102 by retrieving, from the storage drives 171, control information describing the state of one or more memory blocks in the storage drives 171. Retrieving the control information from the storage drives 171 may be carried out, for example, by the storage array controller 110 querying the storage drives 171 for the location of control information for a particular storage drive 171. The storage drives 171 may be configured to execute instructions that enable the storage drive 171 to identify the location of the control information. The instructions may be executed by a controller (not shown) associated with or otherwise located on the storage drive 171 and may cause the storage drive 171 to scan a portion of each memory block to identify the memory blocks that store control information for the storage drives 171. The storage drives 171 may respond by sending a response message to the storage array controller 110 that includes the location of control information for the storage drive 171. Responsive to receiving the response message, storage array controllers 110 may issue a request to read data stored at the address associated with the location of control information for the storage drives 171.

In other implementations, the storage array controllers 110 may further offload device management responsibilities from storage drives 171 by performing, in response to receiving the control information, a storage drive management operation. A storage drive management operation may include, for example, an operation that is typically performed by the storage drive 171 (e.g., the controller (not shown) associated with a particular storage drive 171). A storage drive management operation may include, for example, ensuring that data is not written to failed memory blocks within the storage drive 171, ensuring that data is written to memory blocks within the storage drive 171 in such a way that adequate wear leveling is achieved, and so forth.

In implementations, storage array 102 may implement two or more storage array controllers 110. For example, storage array 102A may include storage array controllers 110A and storage array controllers 110B. At a given instance, a single storage array controller 110 (e.g., storage array controller 110A) of a storage system 100 may be designated with primary status (also referred to as "primary controller" herein), and other storage array controllers 110 (e.g., storage array controller 110A) may be designated with secondary status (also referred to as "secondary controller" herein). The primary controller may have particular rights, such as permission to alter data in persistent storage resource 170 (e.g., writing data to persistent storage resource 170). At least some of the rights of the primary controller may supersede the rights of the secondary controller. For instance, the secondary controller may not have permission to alter data in persistent storage resource 170 when the primary controller has the right. The status of storage array controllers 110 may change. For example, storage array controller 110A may be designated with secondary status, and storage array controller 110B may be designated with primary status.

In some implementations, a primary controller, such as storage array controller 110A, may serve as the primary controller for one or more storage arrays 102, and a second controller, such as storage array controller 110B, may serve as the secondary controller for the one or more storage arrays 102. For example, storage array controller 110A may be the primary controller for storage array 102A and storage array 102B, and storage array controller 110B may be the secondary controller for storage array 102A and 102B. In some implementations, storage array controllers 110C and 110D (also referred to as "storage processing modules") may neither have primary or secondary status. Storage array controllers 110C and 110D, implemented as storage processing modules, may act as a communication interface between the primary and secondary controllers (e.g., storage array controllers 110A and 110B, respectively) and storage array 102B. For example, storage array controller 110A of storage array 102A may send a write request, via SAN 158, to storage array 102B. The write request may be received by both storage array controllers 110C and 110D of storage array 102B. Storage array controllers 110C and 110D facilitate the communication, e.g., send the write request to the appropriate storage drive 171. It may be noted that in some implementations storage processing modules may be used to increase the number of storage drives controlled by the primary and secondary controllers.

In implementations, storage array controllers 110 are communicatively coupled, via a midplane (not shown), to one or more storage drives 171 and to one or more NVRAM devices (not shown) that are included as part of a storage array 102. The storage array controllers 110 may be coupled to the midplane via one or more data communication links and the midplane may be coupled to the storage drives 171 and the NVRAM devices via one or more data communications links. The data communications links described herein are collectively illustrated by data communications links 108 and may include a Peripheral Component Interconnect Express (PCIe) bus, for example.

Figure 1B:
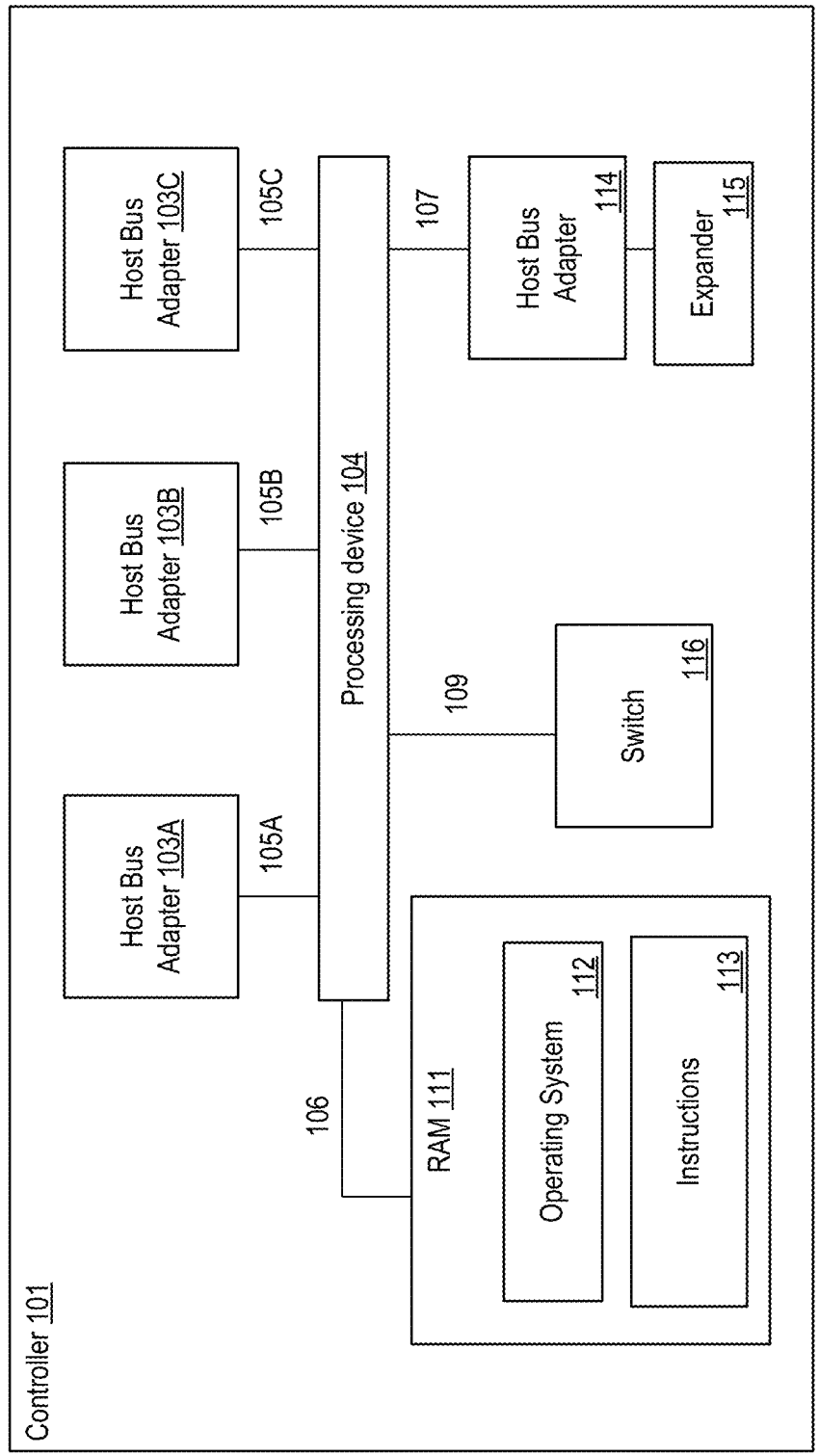
FIG. 1B illustrates a second example system for data storage in accordance with some implementations.

FIG. 1B illustrates an example system for data storage, in accordance with some implementations. Storage array controller 101 illustrated in FIG. 1B may similar to the storage array controllers 110 described with respect to FIG. 1A. In one example, storage array controller 101 may be similar to storage array controller 110A or storage array controller 110B. Storage array controller 101 includes numerous elements for purposes of illustration rather than limitation. It may be noted that storage array controller 101 may include the same, more, or fewer elements configured in the same or different manner in other implementations. It may be noted that elements of FIG. 1A may be included below to help illustrate features of storage array controller 101.

Storage array controller 101 may include one or more processing devices 104 and random access memory (RAM) 111. Processing device 104 (or controller 101) represents one or more general-purpose processing devices such as a microprocessor, central processing unit, or the like. More particularly, the processing device 104 (or controller 101) may be a complex instruction set computing (CISC) microprocessor, reduced instruction set computing (RISC) microprocessor, very long instruction word (VLIW) microprocessor, or a processor implementing other instruction sets or processors implementing a combination of instruction sets.

The processing device 104 (or controller 101) may also be one or more special-purpose processing devices such as an application specific integrated circuit (ASIC), a field programmable gate array (FPGA), a digital signal processor (DSP), network processor, or the like.

The processing device 104 may be connected to the RAM 111 via a data communications link 106, which may be embodied as a high speed memory bus such as a Double-Data Rate 4 (DDR4) bus. Stored in RAM 111 is an operating system 112. In some implementations, instructions 113 are stored in RAM 111. Instructions 113 may include computer program instructions for performing operations in in a direct-mapped flash storage system. In one embodiment, a direct-mapped flash storage system is one that that addresses data blocks within flash drives directly and without an address translation performed by the storage controllers of the flash drives.

In implementations, storage array controller 101 includes one or more host bus adapters 103 that are coupled to the processing device 104 via a data communications link 105. In implementations, host bus adapters 103 may be computer hardware that connects a host system (e.g., the storage array controller) to other network and storage arrays. In some examples, host bus adapters 103 may be a Fibre Channel adapter that enables the storage array controller 101 to connect to a SAN, an Ethernet adapter that enables the storage array controller 101 to connect to a LAN, or the like. Host bus adapters 103 may be coupled to the processing device 104 via a data communications link 105 such as, for example, a PCIe bus.

In implementations, storage array controller 101 may include a host bus adapter 114 that is coupled to an expander 115. The expander 115 may be used to attach a host system to a larger number of storage drives. The expander 115 may, for example, be a SAS expander utilized to enable the host bus adapter 114 to attach to storage drives in an implementation where the host bus adapter 114 is embodied as a SAS controller.

In implementations, storage array controller 101 may include a switch 116 coupled to the processing device 104 via a data communications link 109. The switch 116 may be a computer hardware device that can create multiple endpoints out of a single endpoint, thereby enabling multiple devices to share a single endpoint. The switch 116 may, for example, be a PCIe switch that is coupled to a PCIe bus (e.g., data communications link 109) and presents multiple PCIe connection points to the midplane.

In implementations, storage array controller 101 includes a data communications link 107 for coupling the storage array controller 101 to other storage array controllers. In some examples, data communications link 107 may be a QuickPath Interconnect (QPI) interconnect.

A traditional storage system that uses traditional flash drives may implement a process across the flash drives that are part of the traditional storage system. For example, a higher level process of the storage system may initiate and control a process across the flash drives. However, a flash drive of the traditional storage system may include its own storage controller that also performs the process. Thus, for the traditional storage system, a higher level process (e.g., initiated by the storage system) and a lower level process (e.g., initiated by a storage controller of the storage system) may both be performed.

To resolve various deficiencies of a traditional storage system, operations may be performed by higher level processes and not by the lower level processes. For example, the flash storage system may include flash drives that do not include storage controllers that provide the process. Thus, the operating system of the flash storage system itself may initiate and control the process. This may be accomplished by a direct-mapped flash storage system that addresses data blocks within the flash drives directly and without an address translation performed by the storage controllers of the flash drives.

The operating system of the flash storage system may identify and maintain a list of allocation units (AU) across multiple flash drives of the flash storage system. The allocation units may be entire erase blocks or multiple erase blocks. The operating system may maintain a map or address range that directly maps addresses to erase blocks of the flash drives of the flash storage system.

Direct mapping to the erase blocks of the flash drives may be used to rewrite data and erase data. For example, the operations may be performed on one or more allocation units that include a first data and a second data where the first data is to be retained and the second data is no longer being used by the flash storage system. The operating system may initiate the process to write the first data to new locations within other allocation units and erasing the second data and marking the allocation units as being available for use for subsequent data. Thus, the process may only be performed by the higher level operating system of the flash storage system without an additional lower level process being performed by controllers of the flash drives.

Advantages of the process being performed only by the operating system of the flash storage system include increased reliability of the flash drives of the flash storage system as unnecessary or redundant write operations are not being performed during the process. One possible point of novelty here is the concept of initiating and controlling the process at the operating system of the flash storage system. In addition, the process can be controlled by the operating system across multiple flash drives. This is contrast to the process being performed by a storage controller of a flash drive.

A storage system can consist of two storage array controllers that share a set of drives for failover purposes, or it could consist of a single storage array controller that provides a storage service that utilizes multiple drives, or it could consist of a distributed network of storage array controllers each with some number of drives or some amount of Flash storage where the storage array controllers in the network collaborate to provide a complete storage service and collaborate on various aspects of a storage service including storage allocation and garbage collection.

Figure 1C:
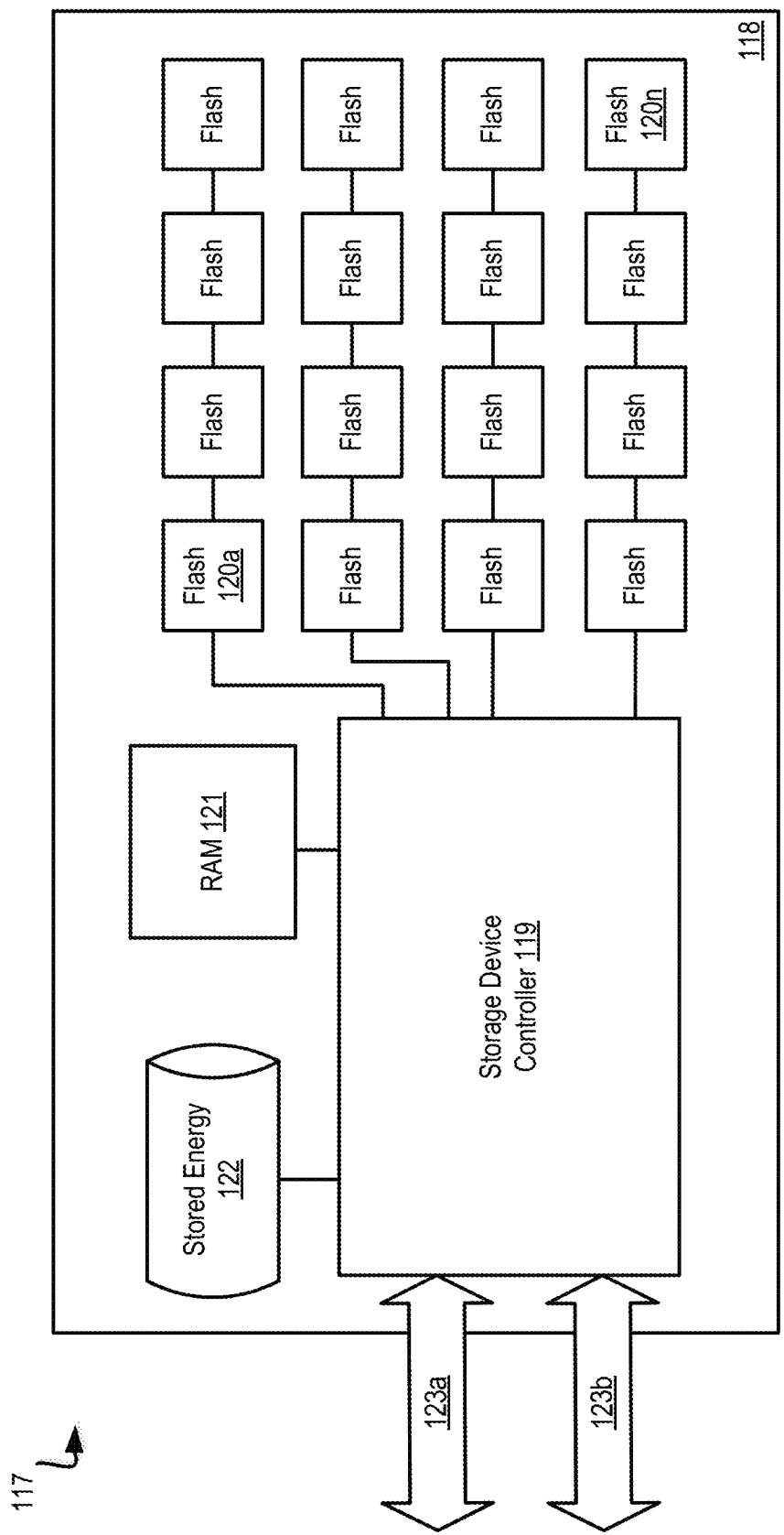
FIG. 1C illustrates a third example system for data storage in accordance with some implementations.

FIG. 1C illustrates a third example system 117 for data storage in accordance with some implementations. System 117 (also referred to as "storage system" herein) includes numerous elements for purposes of illustration rather than limitation. It may be noted that system 117 may include the same, more, or fewer elements configured in the same or different manner in other implementations.

In one embodiment, system 117 includes a dual Peripheral Component Interconnect (PCI) flash storage device 118 with separately addressable fast write storage. System 117 may include a storage controller 119. In one embodiment, storage controller 119 may be a CPU, ASIC, FPGA, or any other circuitry that may implement control structures necessary according to the present disclosure. In one embodiment, system 117 includes flash memory devices (e.g., including flash memory devices 120a-n), operatively coupled to various channels of the storage device controller 119. Flash memory devices 120a-n, may be presented to the controller 119 as an addressable collection of Flash pages, erase blocks, and/or control elements sufficient to allow the storage device controller 119 to program and retrieve various aspects of the Flash. In one embodiment, storage device controller 119 may perform operations on flash memory devices 120A-N including storing and retrieving data content of pages, arranging and erasing any blocks, tracking statistics related to the use and reuse of Flash memory pages, erase blocks, and cells, tracking and predicting error codes and faults within the Flash memory, controlling voltage levels associated with programming and retrieving contents of Flash cells, etc.

In one embodiment, system 117 may include random access memory (RAM) 121 to store separately addressable fast-write data. In one embodiment, RAM 121 may be one or more separate discrete devices. In another embodiment, RAM 121 may be integrated into storage device controller 119 or multiple storage device controllers. The RAM 121 may be utilized for other purposes as well, such as temporary program memory for a processing device (E.g., a central processing unit (CPU)) in the storage device controller 119.

In one embodiment, system 119 may include a stored energy device 122, such as a rechargeable battery or a capacitor. Stored energy device 122 may store energy sufficient to power the storage device controller 119, some amount of the RAM (e.g., RAM 121), and some amount of Flash memory (e.g., Flash memory 120a-120n) for sufficient time to write the contents of RAM to Flash memory. In one embodiment, storage device controller 119 may write the contents of RAM to Flash Memory if the storage device controller detects loss of external power.

In one embodiment, system 117 includes two data communications links 123a, 123b. In one embodiment, data communications links 123a, 123b may be PCI interfaces. In another embodiment, data communications links 123a, 123b may be based on other communications standards (e.g., HyperTransport, InfiBand, etc.). Data communications links 123a, 123b may be based on non-volatile memory express (NVMe) or NCMe over fabrics (NVMf) specifications that allow external connection to the storage device controller 119 from other components in the storage system 117. It should be noted that data communications links may be interchangeably referred to herein as PCI buses for convenience.

System 117 may also include an external power source (not shown), which may be provided over one or both data communications links 123a, 123b, or which may be provided separately. An alternative embodiment includes a separate Flash memory (not shown) dedicated for use in storing the content of RAM 121. The storage device controller 119 may present a logical device over a PCI bus which may include an addressable fast-write logical device, or a distinct part of the logical address space of the storage device 118, which may be presented as PCI memory or as persistent storage. In one embodiment, operations to store into the device are directed into the RAM 121. On power failure, the storage device controller 119 may write stored content associated with the addressable fast-write logical storage to Flash memory (e.g., Flash memory 120a-n) for long-term persistent storage.

In one embodiment, the logical device may include some presentation of some or all of the content of the Flash memory devices 120a-n, where that presentation allows a storage system including a storage device 118 (e.g., storage system 117) to directly address Flash memory pages and directly reprogram erase blocks from storage system components that are external to the storage device through the PCI bus. The presentation may also allow one or more of the external components to control and retrieve other aspects of the Flash memory including some or all of: tracking statistics related to use and reuse of Flash memory pages, erase blocks, and cells across all the Flash memory devices; tracking and predicting error codes and faults within and across the Flash memory devices; controlling voltage levels associated with programming and retrieving contents of Flash cells; etc.

In one embodiment, the stored energy device 122 may be sufficient to ensure completion of in-progress operations to the Flash memory devices 107a-120n stored energy device 122 may power storage device controller 119 and associated Flash memory devices (e.g., 120a-n) for those operations, as well as for the storing of fast-write RAM to Flash memory. Stored energy device 122 may be used to store accumulated statistics and other parameters kept and tracked by the Flash memory devices 120a-n and/or the storage device controller 119. Separate capacitors or stored energy devices (such as smaller capacitors near or embedded within the Flash memory devices themselves) may be used for some or all of the operations described herein.

Various schemes may be used to track and optimize the life span of the stored energy component, such as adjusting voltage levels over time, partially discharging the storage energy device 122 to measure corresponding discharge characteristics, etc. If the available energy decreases over time, the effective available capacity of the addressable fast-write storage may be decreased to ensure that it can be written safely based on the currently available stored energy.

Figure 1D:
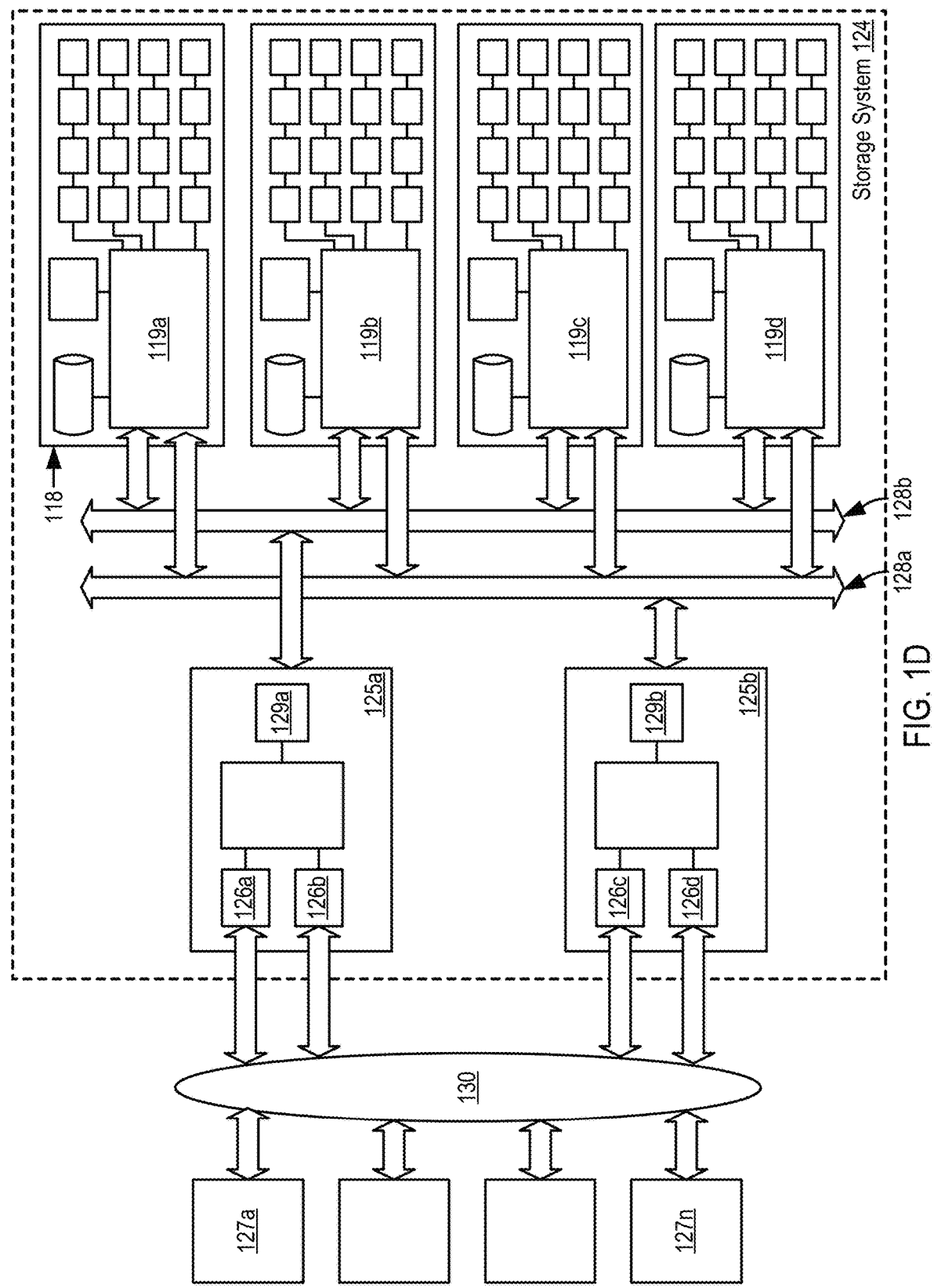
FIG. 1D illustrates a fourth example system for data storage in accordance with some implementations.

FIG. 1D illustrates a third example system 124 for data storage in accordance with some implementations. In one embodiment, system 124 includes storage controllers 125a, 125b. In one embodiment, storage controllers 125a, 125b are operatively coupled to Dual PCI storage devices 119a, 119b and 119c, 119d, respectively. Storage controllers 125a, 125b may be operatively coupled (e.g., via a storage network 130) to some number of host computers 127a-n.

In one embodiment, two storage controllers (e.g., 125a and 125b) provide storage services, such as a small computer system interface (SCSI) block storage array, a file server, an object server, a database or data analytics service, etc. The storage controllers 125a, 125b may provide services through some number of network interfaces (e.g., 126a-d) to host computers 127a-n outside of the storage system 124. Storage controllers 125a, 125b may provide integrated services or an application entirely within the storage system 124, forming a converged storage and compute system. The storage controllers 125a, 125b may utilize the fast write memory within or across storage devices 119a-d to journal in progress operations to ensure the operations are not lost on a power failure, storage controller removal, storage controller or storage system shutdown, or some fault of one or more software or hardware components within the storage system 124.

In one embodiment, controllers 125a, 125b operate as PCI masters to one or the other PCI buses 128a, 128b. In another embodiment, 128a and 128b may be based on other communications standards (e.g., HyperTransport, InfiBand, etc.). Other storage system embodiments may operate storage controllers 125a, 125b as multi-masters for both PCI buses 128a, 128b. Alternately, a PCI/NVMe/NVMf switching infrastructure or fabric may connect multiple storage controllers. Some storage system embodiments may allow storage devices to communicate with each other directly rather than communicating only with storage controllers. In one embodiment, a storage device controller 119a may be operable under direction from a storage controller 125a to synthesize and transfer data to be stored into Flash memory devices from data that has been stored in RAM (e.g., RAM 121 of FIG. 1C). For example, a recalculated version of RAM content may be transferred after a storage controller has determined that an operation has fully committed across the storage system, or when fast-write memory on the device has reached a certain used capacity, or after a certain amount of time, to ensure improve safety of the data or to release addressable fast-write capacity for reuse. This mechanism may be used, for example, to avoid a second transfer over a bus (e.g., 128a, 128b) from the storage controllers 125a, 125b. In one embodiment, a recalculation may include compressing data, attaching indexing or other metadata, combining multiple data segments together, performing erasure code calculations, etc.

In one embodiment, under direction from a storage controller 125a, 125b, a storage device controller 119a, 119b may be operable to calculate and transfer data to other storage devices from data stored in RAM (e.g., RAM 121 of FIG. 1C) without involvement of the storage controllers 125a, 125b. This operation may be used to mirror data stored in one controller 125a to another controller 125b, or it could be used to offload compression, data aggregation, and/or erasure coding calculations and transfers to storage devices to reduce load on storage controllers or the storage controller interface 129a, 129b to the PCI bus 128a, 128b.

A storage device controller 119 may include mechanisms for implementing high availability primitives for use by other parts of a storage system external to the Dual PCI storage device 118. For example, reservation or exclusion primitives may be provided so that, in a storage system with two storage controllers providing a highly available storage service, one storage controller may prevent the other storage controller from accessing or continuing to access the storage device. This could be used, for example, in cases where one controller detects that the other controller is not functioning properly or where the interconnect between the two storage controllers may itself not be functioning properly.

In one embodiment, a storage system for use with Dual PCI direct mapped storage devices with separately addressable fast write storage includes systems that manage erase blocks or groups of erase blocks as allocation units for storing data on behalf of the storage service, or for storing metadata (e.g., indexes, logs, etc.) associated with the storage service, or for proper management of the storage system itself. Flash pages, which may be a few kilobytes in size, may be written as data arrives or as the storage system is to persist data for long intervals of time (e.g., above a defined threshold of time). To commit data more quickly, or to reduce the number of writes to the Flash memory devices, the storage controllers may first write data into the separately addressable fast write storage on one more storage devices.

In one embodiment, the storage controllers 125a, 125b may initiate the use of erase blocks within and across storage devices (e.g., 118) in accordance with an age and expected remaining lifespan of the storage devices, or based on other statistics. The storage controllers 125a, 125b may initiate garbage collection and data migration data between storage devices in accordance with pages that are no longer needed as well as to manage Flash page and erase block lifespans and to manage overall system performance.

In one embodiment, the storage system 124 may utilize mirroring and/or erasure coding schemes as part of storing data into addressable fast write storage and/or as part of writing data into allocation units associated with erase blocks. Erasure codes may be used across storage devices, as well as within erase blocks or allocation units, or within and across Flash memory devices on a single storage device, to provide redundancy against single or multiple storage device failures or to protect against internal corruptions of Flash memory pages resulting from Flash memory operations or from degradation of Flash memory cells. Mirroring and erasure coding at various levels may be used to recover from multiple types of failures that occur separately or in combination.

The embodiments depicted with reference to FIGS. 2A-G illustrate a storage cluster that stores user data, such as user data originating from one or more user or client systems or other sources external to the storage cluster. The storage cluster distributes user data across storage nodes housed within a chassis, or across multiple chassis, using erasure coding and redundant copies of metadata. Erasure coding refers to a method of data protection or reconstruction in which data is stored across a set of different locations, such as disks, storage nodes or geographic locations. Flash memory is one type of solid-state memory that may be integrated with the embodiments, although the embodiments may be extended to other types of solid-state memory or other storage medium, including non-solid state memory. Control of storage locations and workloads are distributed across the storage locations in a clustered peer-to-peer system. Tasks such as mediating communications between the various storage nodes, detecting when a storage node has become unavailable, and balancing I/Os (inputs and outputs) across the various storage nodes, are all handled on a distributed basis. Data is laid out or distributed across multiple storage nodes in data fragments or stripes that support data recovery in some embodiments. Ownership of data can be reassigned within a cluster, independent of input and output patterns. This architecture described in more detail below allows a storage node in the cluster to fail, with the system remaining operational, since the data can be reconstructed from other storage nodes and thus remain available for input and output operations. In various embodiments, a storage node may be referred to as a cluster node, a blade, or a server.

The storage cluster may be contained within a chassis, i.e., an enclosure housing one or more storage nodes. A mechanism to provide power to each storage node, such as a power distribution bus, and a communication mechanism, such as a communication bus that enables communication between the storage nodes are included within the chassis. The storage cluster can run as an independent system in one location according to some embodiments. In one embodiment, a chassis contains at least two instances of both the power distribution and the communication bus which may be enabled or disabled independently. The internal communication bus may be an Ethernet bus, however, other technologies such as Peripheral Component Interconnect (PCI) Express, InfiniBand, and others, are equally suitable. The chassis provides a port for an external communication bus for enabling communication between multiple chassis, directly or through a switch, and with client systems. The external communication may use a technology such as Ethernet, InfiniBand, Fibre Channel, etc. In some embodiments, the external communication bus uses different communication bus technologies for inter-chassis and client communication. If a switch is deployed within or between chassis, the switch may act as a translation between multiple protocols or technologies. When multiple chassis are connected to define a storage cluster, the storage cluster may be accessed by a client using either proprietary interfaces or standard interfaces such as network file system (NFS), common internet file system (CIFS), small computer system interface (SCSI) or hypertext transfer protocol (HTTP). Translation from the client protocol may occur at the switch, chassis external communication bus or within each storage node. In some embodiments, multiple chassis may be coupled or connected to each other through an aggregator switch. A portion and/or all of the coupled or connected chassis may be designated as a storage cluster. As discussed above, each chassis can have multiple blades, each blade has a MAC (media access control) address, but the storage cluster is presented to an external network as having a single cluster IP (Internet Protocol) address and a single MAC address in some embodiments.

Each storage node may be one or more storage servers and each storage server is connected to one or more non-volatile solid state memory units, which may be referred to as storage units or storage devices. One embodiment includes a single storage server in each storage node and between one to eight non-volatile solid state memory units, however this one example is not meant to be limiting. The storage server may include a processor, dynamic random access memory (DRAM) and interfaces for the internal communication bus and power distribution for each of the power buses. Inside the storage node, the interfaces and storage unit share a communication bus, e.g., PCI Express, in some embodiments. The non-volatile solid state memory units may directly access the internal communication bus interface through a storage node communication bus, or request the storage node to access the bus interface. The non-volatile solid state memory unit contains an embedded central processing unit (CPU), solid state storage controller, and a quantity of solid state mass storage, e.g., between 2-32 terabytes (TB) in some embodiments. An embedded volatile storage medium, such as DRAM, and an energy reserve apparatus are included in the non-volatile solid state memory unit. In some embodiments, the energy reserve apparatus is a capacitor, super-capacitor, or battery that enables transferring a subset of DRAM contents to a stable storage medium in the case of power loss. In some embodiments, the non-volatile solid state memory unit is constructed with a storage class memory, such as phase change or magnetoresistive random access memory (MRAM) that substitutes for DRAM and enables a reduced power hold-up apparatus.

One of many features of the storage nodes and non-volatile solid state storage is the ability to proactively rebuild data in a storage cluster. The storage nodes and non-volatile solid state storage can determine when a storage node or non-volatile solid state storage in the storage cluster is unreachable, independent of whether there is an attempt to read data involving that storage node or non-volatile solid state storage. The storage nodes and non-volatile solid state storage then cooperate to recover and rebuild the data in at least partially new locations. This constitutes a proactive rebuild, in that the system rebuilds data without waiting until the data is needed for a read access initiated from a client system employing the storage cluster. These and further details of the storage memory and operation thereof are discussed below.

Figure 2A:
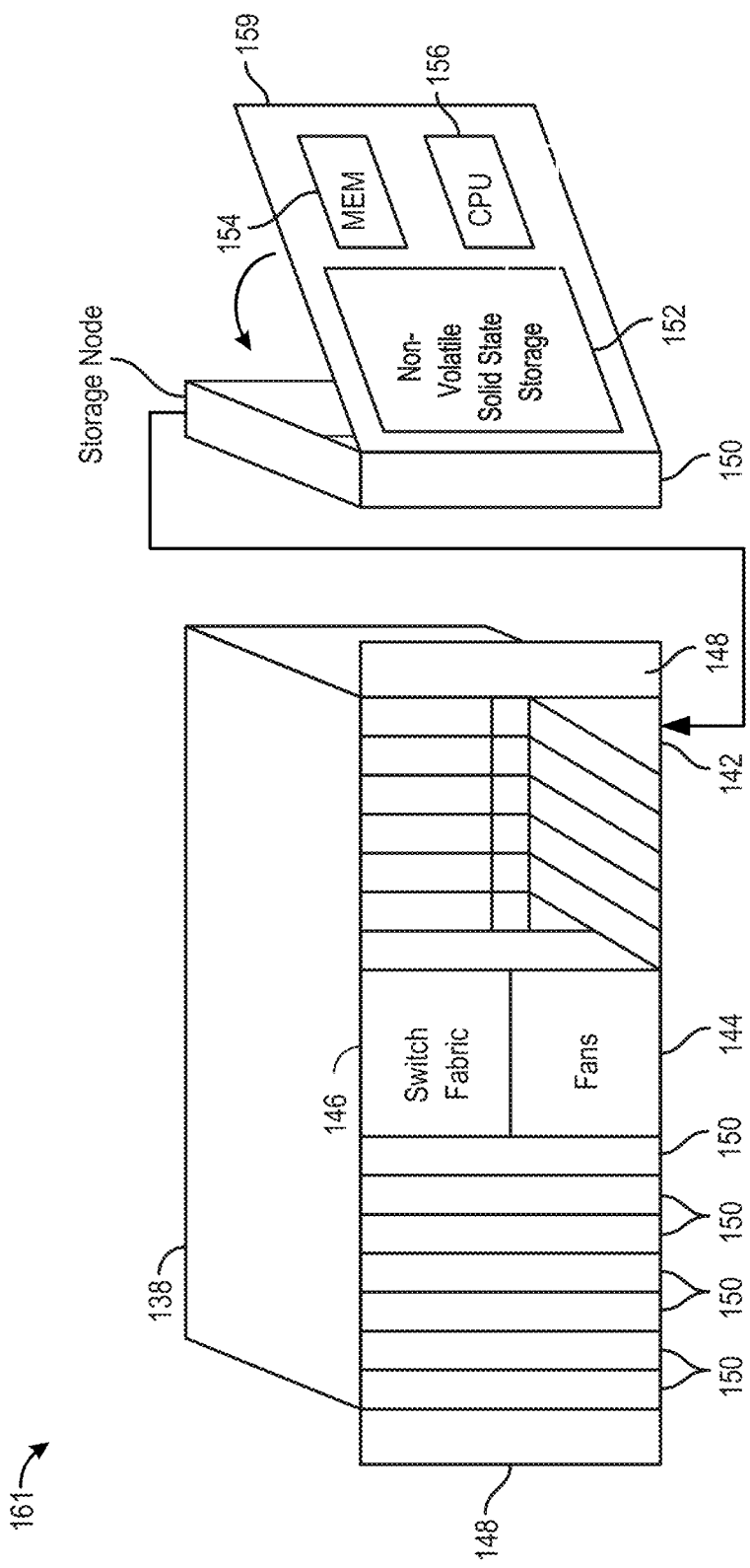
FIG. 2A is a perspective view of a storage cluster with multiple storage nodes and internal storage coupled to each storage node to provide network attached storage, in accordance with some embodiments.

FIG. 2A is a perspective view of a storage cluster 161, with multiple storage nodes 150 and internal solid-state memory coupled to each storage node to provide network attached storage or storage area network, in accordance with some embodiments. A network attached storage, storage area network, or a storage cluster, or other storage memory, could include one or more storage clusters 161, each having one or more storage nodes 150, in a flexible and reconfigurable arrangement of both the physical components and the amount of storage memory provided thereby. The storage cluster 161 is designed to fit in a rack, and one or more racks can be set up and populated as desired for the storage memory. The storage cluster 161 has a chassis 138 having multiple slots 142. It should be appreciated that chassis 138 may be referred to as a housing, enclosure, or rack unit. In one embodiment, the chassis 138 has fourteen slots 142, although other numbers of slots are readily devised. For example, some embodiments have four slots, eight slots, sixteen slots, thirty-two slots, or other suitable number of slots. Each slot 142 can accommodate one storage node 150 in some embodiments. Chassis 138 includes flaps 148 that can be utilized to mount the chassis 138 on a rack. Fans 144 provide air circulation for cooling of the storage nodes 150 and components thereof, although other cooling components could be used, or an embodiment could be devised without cooling components. A switch fabric 146 couples storage nodes 150 within chassis 138 together and to a network for communication to the memory. In an embodiment depicted in FIG. 1, the slots 142 to the left of the switch fabric 146 and fans 144 are shown occupied by storage nodes 150, while the slots 142 to the right of the switch fabric 146 and fans 144 are empty and available for insertion of storage node 150 for illustrative purposes. This configuration is one example, and one or more storage nodes 150 could occupy the slots 142 in various further arrangements. The storage node arrangements need not be sequential or adjacent in some embodiments. Storage nodes 150 are hot pluggable, meaning that a storage node 150 can be inserted into a slot 142 in the chassis 138, or removed from a slot 142, without stopping or powering down the system. Upon insertion or removal of storage node 150 from slot 142, the system automatically reconfigures in order to recognize and adapt to the change. Reconfiguration, in some embodiments, includes restoring redundancy and/or rebalancing data or load.

Each storage node 150 can have multiple components. In the embodiment shown here, the storage node 150 includes a printed circuit board 159 populated by a CPU 156, i.e., processor, a memory 154 coupled to the CPU 156, and a non-volatile solid state storage 152 coupled to the CPU 156, although other mountings and/or components could be used in further embodiments. The memory 154 has instructions which are executed by the CPU 156 and/or data operated on by the CPU 156. As further explained below, the non-volatile solid state storage 152 includes flash or, in further embodiments, other types of solid-state memory.

Referring to FIG. 2A, storage cluster 161 is scalable, meaning that storage capacity with non-uniform storage sizes is readily added, as described above. One or more storage nodes 150 can be plugged into or removed from each chassis and the storage cluster self-configures in some embodiments. Plug-in storage nodes 150, whether installed in a chassis as delivered or later added, can have different sizes. For example, in one embodiment a storage node 150 can have any multiple of 4 TB, e.g., 8 TB, 12 TB, 16 TB, 32 TB, etc. In further embodiments, a storage node 150 could have any multiple of other storage amounts or capacities. Storage capacity of each storage node 150 is broadcast, and influences decisions of how to stripe the data. For maximum storage efficiency, an embodiment can self-configure as wide as possible in the stripe, subject to a predetermined requirement of continued operation with loss of up to one, or up to two, non-volatile solid state storage units 152 or storage nodes 150 within the chassis.

Figure 2B:
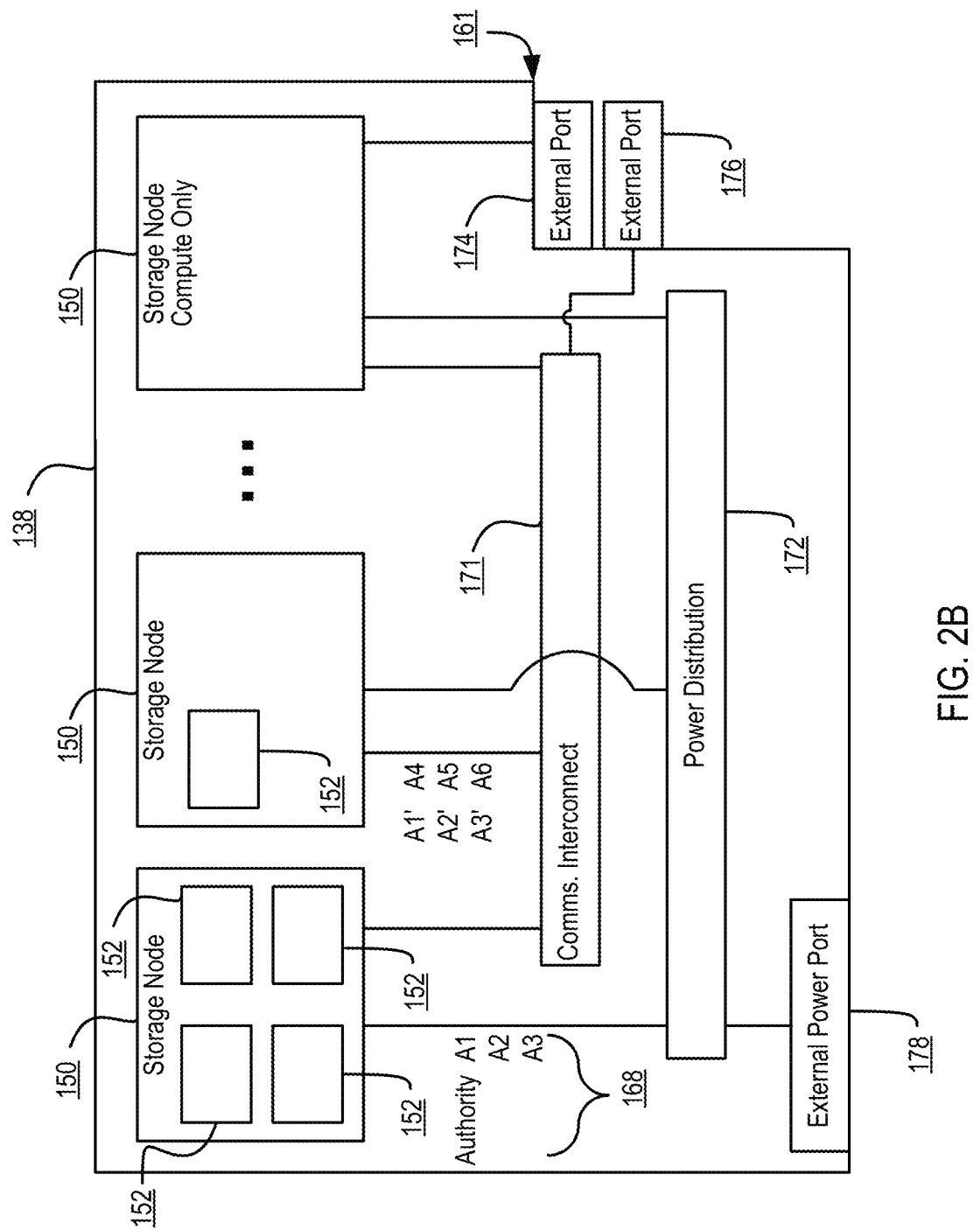
FIG. 2B is a block diagram showing an interconnect switch coupling multiple storage nodes in accordance with some embodiments.

FIG. 2B is a block diagram showing a communications interconnect 171 and power distribution bus 172 coupling multiple storage nodes 150. Referring back to FIG. 2A, the communications interconnect 171 can be included in or implemented with the switch fabric 146 in some embodiments. Where multiple storage clusters 161 occupy a rack, the communications interconnect 171 can be included in or implemented with a top of rack switch, in some embodiments. As illustrated in FIG. 2B, storage cluster 161 is enclosed within a single chassis 138. External port 176 is coupled to storage nodes 150 through communications interconnect 171, while external port 174 is coupled directly to a storage node. External power port 178 is coupled to power distribution bus 172. Storage nodes 150 may include varying amounts and differing capacities of non-volatile solid state storage 152 as described with reference to FIG. 2A. In addition, one or more storage nodes 150 may be a compute only storage node as illustrated in FIG. 2B. Authorities 168 are implemented on the non-volatile solid state storages 152, for example as lists or other data structures stored in memory. In some embodiments the authorities are stored within the non-volatile solid state storage 152 and supported by software executing on a controller or other processor of the non-volatile solid state storage 152. In a further embodiment, authorities 168 are implemented on the storage nodes 150, for example as lists or other data structures stored in the memory 154 and supported by software executing on the CPU 156 of the storage node 150. Authorities 168 control how and where data is stored in the non-volatile solid state storages 152 in some embodiments. This control assists in determining which type of erasure coding scheme is applied to the data, and which storage nodes 150 have which portions of the data. Each authority 168 may be assigned to a non-volatile solid state storage 152. Each authority may control a range of inode numbers, segment numbers, or other data identifiers which are assigned to data by a file system, by the storage nodes 150, or by the non-volatile solid state storage 152, in various embodiments.

Every piece of data, and every piece of metadata, has redundancy in the system in some embodiments. In addition, every piece of data and every piece of metadata has an owner, which may be referred to as an authority. If that authority is unreachable, for example through failure of a storage node, there is a plan of succession for how to find that data or that metadata. In various embodiments, there are redundant copies of authorities 168. Authorities 168 have a relationship to storage nodes 150 and non-volatile solid state storage 152 in some embodiments. Each authority 168, covering a range of data segment numbers or other identifiers of the data, may be assigned to a specific non-volatile solid state storage 152. In some embodiments the authorities 168 for all of such ranges are distributed over the non-volatile solid state storages 152 of a storage cluster. Each storage node 150 has a network port that provides access to the non-volatile solid state storage(s) 152 of that storage node 150. Data can be stored in a segment, which is associated with a segment number and that segment number is an indirection for a configuration of a RAID (redundant array of independent disks) stripe in some embodiments. The assignment and use of the authorities 168 thus establishes an indirection to data. Indirection may be referred to as the ability to reference data indirectly, in this case via an authority 168, in accordance with some embodiments. A segment identifies a set of non-volatile solid state storage 152 and a local identifier into the set of non-volatile solid state storage 152 that may contain data. In some embodiments, the local identifier is an offset into the device and may be reused sequentially by multiple segments. In other embodiments the local identifier is unique for a specific segment and never reused. The offsets in the non-volatile solid state storage 152 are applied to locating data for writing to or reading from the non-volatile solid state storage 152 (in the form of a RAID stripe). Data is striped across multiple units of non-volatile solid state storage 152, which may include or be different from the non-volatile solid state storage 152 having the authority 168 for a particular data segment.

If there is a change in where a particular segment of data is located, e.g., during a data move or a data reconstruction, the authority 168 for that data segment should be consulted, at that non-volatile solid state storage 152 or storage node 150 having that authority 168. In order to locate a particular piece of data, embodiments calculate a hash value for a data segment or apply an inode number or a data segment number. The output of this operation points to a non-volatile solid state storage 152 having the authority 168 for that particular piece of data. In some embodiments there are two stages to this operation. The first stage maps an entity identifier (ID), e.g., a segment number, inode number, or directory number to an authority identifier. This mapping may include a calculation such as a hash or a bit mask. The second stage is mapping the authority identifier to a particular non-volatile solid state storage 152, which may be done through an explicit mapping. The operation is repeatable, so that when the calculation is performed, the result of the calculation repeatably and reliably points to a particular non-volatile solid state storage 152 having that authority 168. The operation may include the set of reachable storage nodes as input. If the set of reachable non-volatile solid state storage units changes the optimal set changes. In some embodiments, the persisted value is the current assignment (which is always true) and the calculated value is the target assignment the cluster will attempt to reconfigure towards. This calculation may be used to determine the optimal non-volatile solid state storage 152 for an authority in the presence of a set of non-volatile solid state storage 152 that are reachable and constitute the same cluster. The calculation also determines an ordered set of peer non-volatile solid state storage 152 that will also record the authority to non-volatile solid state storage mapping so that the authority may be determined even if the assigned non-volatile solid state storage is unreachable. A duplicate or substitute authority 168 may be consulted if a specific authority 168 is unavailable in some embodiments.

With reference to FIGS. 2A and 2B, two of the many tasks of the CPU 156 on a storage node 150 are to break up write data, and reassemble read data. When the system has determined that data is to be written, the authority 168 for that data is located as above. When the segment ID for data is already determined the request to write is forwarded to the non-volatile solid state storage 152 currently determined to be the host of the authority 168 determined from the segment. The host CPU 156 of the storage node 150, on which the non-volatile solid state storage 152 and corresponding authority 168 reside, then breaks up or shards the data and transmits the data out to various non-volatile solid state storage 152. The transmitted data is written as a data stripe in accordance with an erasure coding scheme. In some embodiments, data is requested to be pulled, and in other embodiments, data is pushed. In reverse, when data is read, the authority 168 for the segment ID containing the data is located as described above. The host CPU 156 of the storage node 150 on which the non-volatile solid state storage 152 and corresponding authority 168 reside requests the data from the non-volatile solid state storage and corresponding storage nodes pointed to by the authority. In some embodiments the data is read from flash storage as a data stripe. The host CPU 156 of storage node 150 then reassembles the read data, correcting any errors (if present) according to the appropriate erasure coding scheme, and forwards the reassembled data to the network. In further embodiments, some or all of these tasks can be handled in the non-volatile solid state storage 152. In some embodiments, the segment host requests the data be sent to storage node 150 by requesting pages from storage and then sending the data to the storage node making the original request.

In some systems, for example in UNIX-style file systems, data is handled with an index node or inode, which specifies a data structure that represents an object in a file system. The object could be a file or a directory, for example. Metadata may accompany the object, as attributes such as permission data and a creation timestamp, among other attributes. A segment number could be assigned to all or a portion of such an object in a file system. In other systems, data segments are handled with a segment number assigned elsewhere. For purposes of discussion, the unit of distribution is an entity, and an entity can be a file, a directory or a segment. That is, entities are units of data or metadata stored by a storage system. Entities are grouped into sets called authorities. Each authority has an authority owner, which is a storage node that has the exclusive right to update the entities in the authority. In other words, a storage node contains the authority, and that the authority, in turn, contains entities.

A segment is a logical container of data in accordance with some embodiments. A segment is an address space between medium address space and physical flash locations, i.e., the data segment number, are in this address space. Segments may also contain meta-data, which enable data redundancy to be restored (rewritten to different flash locations or devices) without the involvement of higher level software. In one embodiment, an internal format of a segment contains client data and medium mappings to determine the position of that data. Each data segment is protected, e.g., from memory and other failures, by breaking the segment into a number of data and parity shards, where applicable. The data and parity shards are distributed, i.e., striped, across non-volatile solid state storage 152 coupled to the host CPUs 156 (See FIGS. 2E and 2G) in accordance with an erasure coding scheme. Usage of the term segments refers to the container and its place in the address space of segments in some embodiments. Usage of the term stripe refers to the same set of shards as a segment and includes how the shards are distributed along with redundancy or parity information in accordance with some embodiments.

A series of address-space transformations takes place across an entire storage system. At the top are the directory entries (file names) which link to an inode. Modes point into medium address space, where data is logically stored. Medium addresses may be mapped through a series of indirect mediums to spread the load of large files, or implement data services like deduplication or snapshots. Medium addresses may be mapped through a series of indirect mediums to spread the load of large files, or implement data services like deduplication or snapshots. Segment addresses are then translated into physical flash locations. Physical flash locations have an address range bounded by the amount of flash in the system in accordance with some embodiments. Medium addresses and segment addresses are logical containers, and in some embodiments use a 128 bit or larger identifier so as to be practically infinite, with a likelihood of reuse calculated as longer than the expected life of the system. Addresses from logical containers are allocated in a hierarchical fashion in some embodiments. Initially, each non-volatile solid state storage unit 152 may be assigned a range of address space. Within this assigned range, the non-volatile solid state storage 152 is able to allocate addresses without synchronization with other non-volatile solid state storage 152.

Data and metadata is stored by a set of underlying storage layouts that are optimized for varying workload patterns and storage devices. These layouts incorporate multiple redundancy schemes, compression formats and index algorithms. Some of these layouts store information about authorities and authority masters, while others store file metadata and file data. The redundancy schemes include error correction codes that tolerate corrupted bits within a single storage device (such as a NAND flash chip), erasure codes that tolerate the failure of multiple storage nodes, and replication schemes that tolerate data center or regional failures. In some embodiments, low density parity check (LDPC) code is used within a single storage unit. Reed-Solomon encoding is used within a storage cluster, and mirroring is used within a storage grid in some embodiments. Metadata may be stored using an ordered log structured index (such as a Log Structured Merge Tree), and large data may not be stored in a log structured layout.

In order to maintain consistency across multiple copies of an entity, the storage nodes agree implicitly on two things through calculations: (1) the authority that contains the entity, and (2) the storage node that contains the authority. The assignment of entities to authorities can be done by pseudo randomly assigning entities to authorities, by splitting entities into ranges based upon an externally produced key, or by placing a single entity into each authority. Examples of pseudorandom schemes are linear hashing and the Replication Under Scalable Hashing (RUSH) family of hashes, including Controlled Replication Under Scalable Hashing (CRUSH). In some embodiments, pseudo-random assignment is utilized only for assigning authorities to nodes because the set of nodes can change. The set of authorities cannot change so any subjective function may be applied in these embodiments. Some placement schemes automatically place authorities on storage nodes, while other placement schemes rely on an explicit mapping of authorities to storage nodes. In some embodiments, a pseudorandom scheme is utilized to map from each authority to a set of candidate authority owners. A pseudorandom data distribution function related to CRUSH may assign authorities to storage nodes and create a list of where the authorities are assigned. Each storage node has a copy of the pseudorandom data distribution function, and can arrive at the same calculation for distributing, and later finding or locating an authority. Each of the pseudorandom schemes requires the reachable set of storage nodes as input in some embodiments in order to conclude the same target nodes. Once an entity has been placed in an authority, the entity may be stored on physical devices so that no expected failure will lead to unexpected data loss. In some embodiments, rebalancing algorithms attempt to store the copies of all entities within an authority in the same layout and on the same set of machines.

Examples of expected failures include device failures, stolen machines, datacenter fires, and regional disasters, such as nuclear or geological events. Different failures lead to different levels of acceptable data loss. In some embodiments, a stolen storage node impacts neither the security nor the reliability of the system, while depending on system configuration, a regional event could lead to no loss of data, a few seconds or minutes of lost updates, or even complete data loss.

In the embodiments, the placement of data for storage redundancy is independent of the placement of authorities for data consistency. In some embodiments, storage nodes that contain authorities do not contain any persistent storage. Instead, the storage nodes are connected to non-volatile solid state storage units that do not contain authorities. The communications interconnect between storage nodes and non-volatile solid state storage units consists of multiple communication technologies and has non-uniform performance and fault tolerance characteristics. In some embodiments, as mentioned above, non-volatile solid state storage units are connected to storage nodes via PCI express, storage nodes are connected together within a single chassis using Ethernet backplane, and chassis are connected together to form a storage cluster. Storage clusters are connected to clients using Ethernet or fiber channel in some embodiments. If multiple storage clusters are configured into a storage grid, the multiple storage clusters are connected using the Internet or other long-distance networking links, such as a "metro scale" link or private link that does not traverse the internet.

Authority owners have the exclusive right to modify entities, to migrate entities from one non-volatile solid state storage unit to another non-volatile solid state storage unit, and to add and remove copies of entities. This allows for maintaining the redundancy of the underlying data. When an authority owner fails, is going to be decommissioned, or is overloaded, the authority is transferred to a new storage node. Transient failures make it non-trivial to ensure that all non-faulty machines agree upon the new authority location. The ambiguity that arises due to transient failures can be achieved automatically by a consensus protocol such as Paxos, hot-warm failover schemes, via manual intervention by a remote system administrator, or by a local hardware administrator (such as by physically removing the failed machine from the cluster, or pressing a button on the failed machine). In some embodiments, a consensus protocol is used, and failover is automatic. If too many failures or replication events occur in too short a time period, the system goes into a self-preservation mode and halts replication and data movement activities until an administrator intervenes in accordance with some embodiments.

As authorities are transferred between storage nodes and authority owners update entities in their authorities, the system transfers messages between the storage nodes and non-volatile solid state storage units. With regard to persistent messages, messages that have different purposes are of different types. Depending on the type of the message, the system maintains different ordering and durability guarantees. As the persistent messages are being processed, the messages are temporarily stored in multiple durable and non-durable storage hardware technologies. In some embodiments, messages are stored in RAM, NVRAM and on NAND flash devices, and a variety of protocols are used in order to make efficient use of each storage medium. Latency-sensitive client requests may be persisted in replicated NVRAM, and then later NAND, while background rebalancing operations are persisted directly to NAND.

Persistent messages are persistently stored prior to being transmitted. This allows the system to continue to serve client requests despite failures and component replacement. Although many hardware components contain unique identifiers that are visible to system administrators, manufacturer, hardware supply chain and ongoing monitoring quality control infrastructure, applications running on top of the infrastructure address virtualize addresses. These virtualized addresses do not change over the lifetime of the storage system, regardless of component failures and replacements. This allows each component of the storage system to be replaced over time without reconfiguration or disruptions of client request processing, i.e., the system supports non-disruptive upgrades.

In some embodiments, the virtualized addresses are stored with sufficient redundancy. A continuous monitoring system correlates hardware and software status and the hardware identifiers. This allows detection and prediction of failures due to faulty components and manufacturing details. The monitoring system also enables the proactive transfer of authorities and entities away from impacted devices before failure occurs by removing the component from the critical path in some embodiments.

Figure 2C:
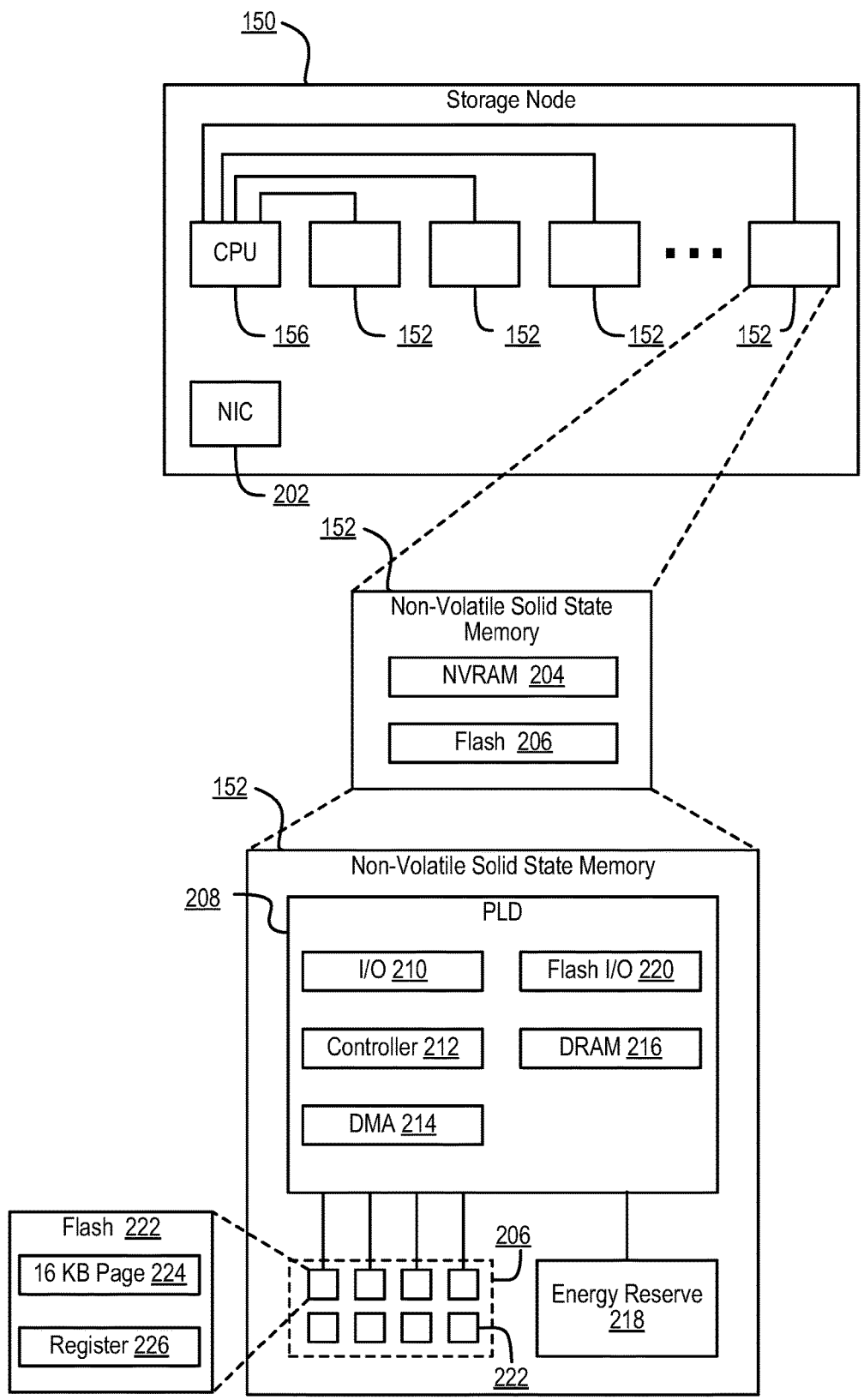
FIG. 2C is a multiple level block diagram, showing contents of a storage node and contents of one of the non-volatile solid state storage units in accordance with some embodiments.

FIG. 2C is a multiple level block diagram, showing contents of a storage node 150 and contents of a non-volatile solid state storage 152 of the storage node 150. Data is communicated to and from the storage node 150 by a network interface controller (NIC) 202 in some embodiments. Each storage node 150 has a CPU 156, and one or more non-volatile solid state storage 152, as discussed above. Moving down one level in FIG. 2C, each non-volatile solid state storage 152 has a relatively fast non-volatile solid state memory, such as nonvolatile random access memory (NVRAM) 204, and flash memory 206. In some embodiments, NVRAM 204 may be a component that does not require program/erase cycles (DRAM, MRAM, PCM), and can be a memory that can support being written vastly more often than the memory is read from. Moving down another level in FIG. 2C, the NVRAM 204 is implemented in one embodiment as high speed volatile memory, such as dynamic random access memory (DRAM) 216, backed up by energy reserve 218. Energy reserve 218 provides sufficient electrical power to keep the DRAM 216 powered long enough for contents to be transferred to the flash memory 206 in the event of power failure. In some embodiments, energy reserve 218 is a capacitor, super-capacitor, battery, or other device, that supplies a suitable supply of energy sufficient to enable the transfer of the contents of DRAM 216 to a stable storage medium in the case of power loss. The flash memory 206 is implemented as multiple flash dies 222, which may be referred to as packages of flash dies 222 or an array of flash dies 222. It should be appreciated that the flash dies 222 could be packaged in any number of ways, with a single die per package, multiple dies per package (i.e. multichip packages), in hybrid packages, as bare dies on a printed circuit board or other substrate, as encapsulated dies, etc. In the embodiment shown, the non-volatile solid state storage 152 has a controller 212 or other processor, and an input output (I/O) port 210 coupled to the controller 212. I/O port 210 is coupled to the CPU 156 and/or the network interface controller 202 of the flash storage node 150. Flash input output (I/O) port 220 is coupled to the flash dies 222, and a direct memory access unit (DMA) 214 is coupled to the controller 212, the DRAM 216 and the flash dies 222. In the embodiment shown, the I/O port 210, controller 212, DMA unit 214 and flash I/O port 220 are implemented on a programmable logic device (PLD) 208, e.g., a field programmable gate array (FPGA). In this embodiment, each flash die 222 has pages, organized as sixteen kB (kilobyte) pages 224, and a register 226 through which data can be written to or read from the flash die 222. In further embodiments, other types of solid-state memory are used in place of, or in addition to flash memory illustrated within flash die 222.

Storage clusters 161, in various embodiments as disclosed herein, can be contrasted with storage arrays in general. The storage nodes 150 are part of a collection that creates the storage cluster 161. Each storage node 150 owns a slice of data and computing required to provide the data. Multiple storage nodes 150 cooperate to store and retrieve the data. Storage memory or storage devices, as used in storage arrays in general, are less involved with processing and manipulating the data. Storage memory or storage devices in a storage array receive commands to read, write, or erase data. The storage memory or storage devices in a storage array are not aware of a larger system in which they are embedded, or what the data means. Storage memory or storage devices in storage arrays can include various types of storage memory, such as RAM, solid state drives, hard disk drives, etc. The storage units 152 described herein have multiple interfaces active simultaneously and serving multiple purposes. In some embodiments, some of the functionality of a storage node 150 is shifted into a storage unit 152, transforming the storage unit 152 into a combination of storage unit 152 and storage node 150. Placing computing (relative to storage data) into the storage unit 152 places this computing closer to the data itself. The various system embodiments have a hierarchy of storage node layers with different capabilities. By contrast, in a storage array, a controller owns and knows everything about all of the data that the controller manages in a shelf or storage devices. In a storage cluster 161, as described herein, multiple controllers in multiple storage units 152 and/or storage nodes 150 cooperate in various ways (e.g., for erasure coding, data sharding, metadata communication and redundancy, storage capacity expansion or contraction, data recovery, and so on).

Figure 2D:
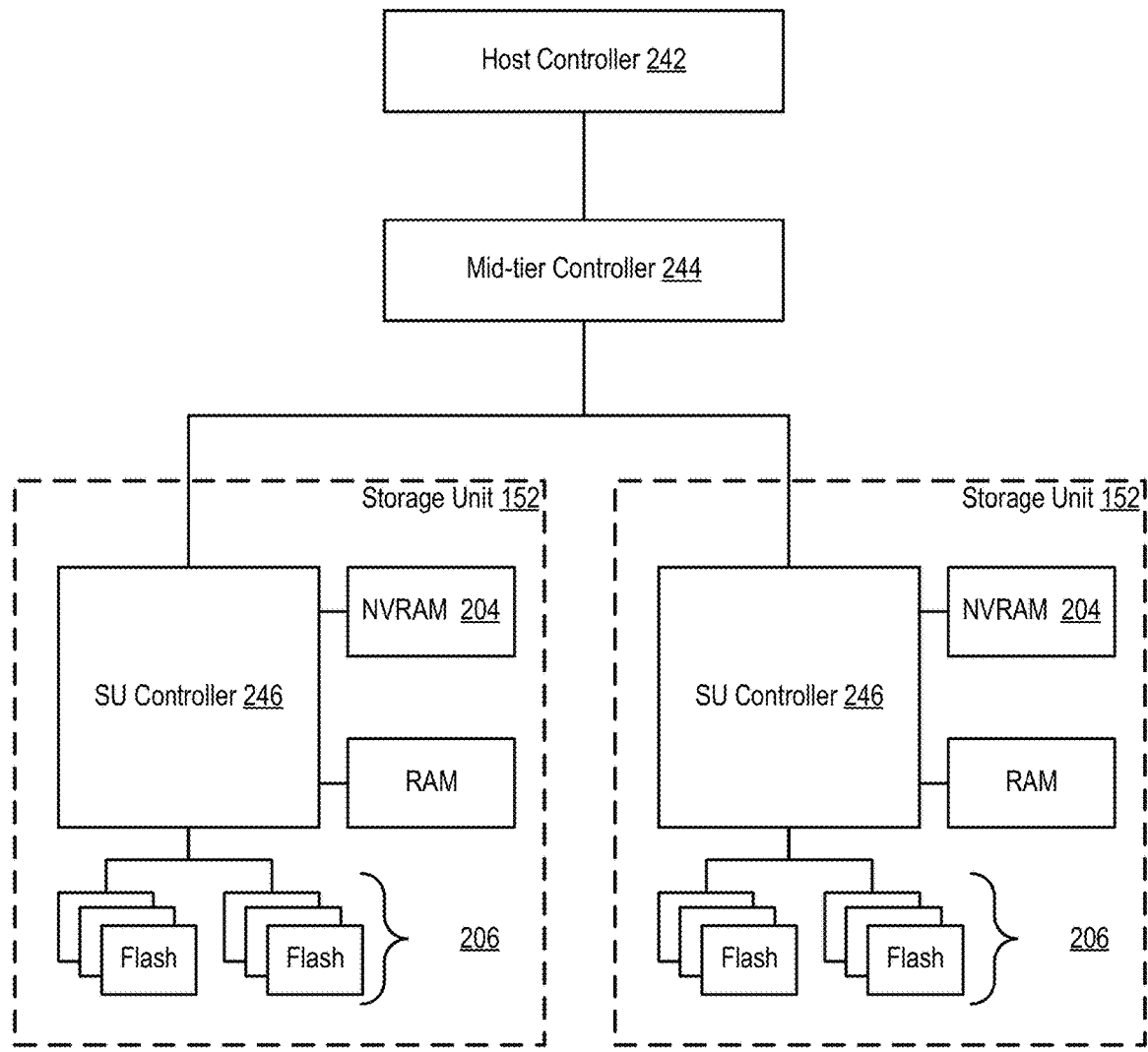
FIG. 2D shows a storage server environment, which uses embodiments of the storage nodes and storage units of FIGS. 1-3 in accordance with some embodiments.

FIG. 2D shows a storage server environment, which uses embodiments of the storage nodes 150 and storage units 152 of FIGS. 2A-C. In this version, each storage unit 152 has a processor such as controller 212 (see FIG. 2C), an FPGA (field programmable gate array), flash memory 206, and NVRAM 204 (which is super-capacitor backed DRAM 216, see FIGS. 2B and 2C) on a PCIe (peripheral component interconnect express) board in a chassis 138 (see FIG. 2A). The storage unit 152 may be implemented as a single board containing storage, and may be the largest tolerable failure domain inside the chassis. In some embodiments, up to two storage units 152 may fail and the device will continue with no data loss.

The physical storage is divided into named regions based on application usage in some embodiments. The NVRAM 204 is a contiguous block of reserved memory in the storage unit 152 DRAM 216, and is backed by NAND flash. NVRAM 204 is logically divided into multiple memory regions written for two as spool (e.g., spool region). Space within the NVRAM 204 spools is managed by each authority 168 independently. Each device provides an amount of storage space to each authority 168. That authority 168 further manages lifetimes and allocations within that space. Examples of a spool include distributed transactions or notions. When the primary power to a storage unit 152 fails, onboard super-capacitors provide a short duration of power hold up. During this holdup interval, the contents of the NVRAM 204 are flushed to flash memory 206. On the next power-on, the contents of the NVRAM 204 are recovered from the flash memory 206.

As for the storage unit controller, the responsibility of the logical "controller" is distributed across each of the blades containing authorities 168. This distribution of logical control is shown in FIG. 2D as a host controller 242, mid-tier controller 244 and storage unit controller(s) 246. Management of the control plane and the storage plane are treated independently, although parts may be physically co-located on the same blade. Each authority 168 effectively serves as an independent controller. Each authority 168 provides its own data and metadata structures, its own background workers, and maintains its own lifecycle.

FIG. 2E is a blade 252 hardware block diagram, showing a control plane 254, compute and storage planes 256, 258, and authorities 168 interacting with underlying physical resources, using embodiments of the storage nodes 150 and storage units 152 of FIGS. 2A-C in the storage server environment of FIG. 2D. The control plane 254 is partitioned into a number of authorities 168 which can use the compute resources in the compute plane 256 to run on any of the blades 252. The storage plane 258 is partitioned into a set of devices, each of which provides access to flash 206 and NVRAM 204 resources.

In the compute and storage planes 256, 258 of FIG. 2E, the authorities 168 interact with the underlying physical resources (i.e., devices). From the point of view of an authority 168, its resources are striped over all of the physical devices. From the point of view of a device, it provides resources to all authorities 168, irrespective of where the authorities happen to run. Each authority 168 has allocated or has been allocated one or more partitions 260 of storage memory in the storage units 152, e.g. partitions 260 in flash memory 206 and NVRAM 204. Each authority 168 uses those allocated partitions 260 that belong to it, for writing or reading user data. Authorities can be associated with differing amounts of physical storage of the system. For example, one authority 168 could have a larger number of partitions 260 or larger sized partitions 260 in one or more storage units 152 than one or more other authorities 168.

Figure 2F:
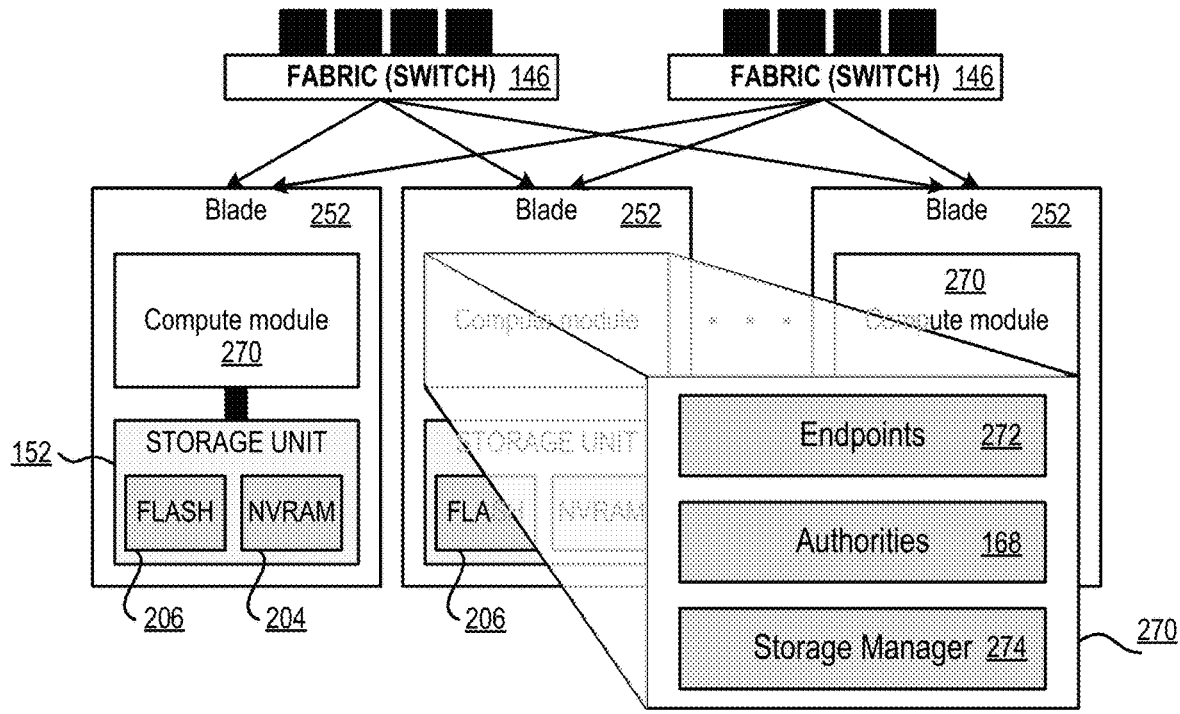
FIG. 2F depicts elasticity software layers in blades of a storage cluster, in accordance with some embodiments.

FIG. 2F depicts elasticity software layers in blades 252 of a storage cluster 161, in accordance with some embodiments. In the elasticity structure, elasticity software is symmetric, i.e., each blade's compute module 270 runs the three identical layers of processes depicted in FIG. 2F. Storage managers 274 execute read and write requests from other blades 252 for data and metadata stored in local storage unit 152 NVRAM 204 and flash 206. Authorities 168 fulfill client requests by issuing the necessary reads and writes to the blades 252 on whose storage units 152 the corresponding data or metadata resides. Endpoints 272 parse client connection requests received from switch fabric 146 supervisory software, relay the client connection requests to the authorities 168 responsible for fulfillment, and relay the authorities' 168 responses to clients. The symmetric three-layer structure enables the storage system's high degree of concurrency. Elasticity scales out efficiently and reliably in these embodiments. In addition, elasticity implements a unique scale-out technique that balances work evenly across all resources regardless of client access pattern, and maximizes concurrency by eliminating much of the need for inter-blade coordination that typically occurs with conventional distributed locking.

Still referring to FIG. 2F, authorities 168 running in the compute modules 270 of a blade 252 perform the internal operations required to fulfill client requests. One feature of elasticity is that authorities 168 are stateless, i.e., they cache active data and metadata in their own blades' 168 DRAMs for fast access, but the authorities store every update in their NVRAM 204 partitions on three separate blades 252 until the update has been written to flash 206. All the storage system writes to NVRAM 204 are in triplicate to partitions on three separate blades 252 in some embodiments. With triple-mirrored NVRAM 204 and persistent storage protected by parity and Reed-Solomon RAID checksums, the storage system can survive concurrent failure of two blades 252 with no loss of data, metadata, or access to either.

Because authorities 168 are stateless, they can migrate between blades 252. Each authority 168 has a unique identifier. NVRAM 204 and flash 206 partitions are associated with authorities' 168 identifiers, not with the blades 252 on which they are running in some. Thus, when an authority 168 migrates, the authority 168 continues to manage the same storage partitions from its new location. When a new blade 252 is installed in an embodiment of the storage cluster 161, the system automatically rebalances load by:

Partitioning the new blade's 252 storage for use by the system's authorities 168, Migrating selected authorities 168 to the new blade 252, Starting endpoints 272 on the new blade 252 and including them in the switch fabric's 146 client connection distribution algorithm.

From their new locations, migrated authorities 168 persist the contents of their NVRAM 204 partitions on flash 206, process read and write requests from other authorities 168, and fulfill the client requests that endpoints 272 direct to them. Similarly, if a blade 252 fails or is removed, the system redistributes its authorities 168 among the system's remaining blades 252. The redistributed authorities 168 continue to perform their original functions from their new locations.

Figure 2G:
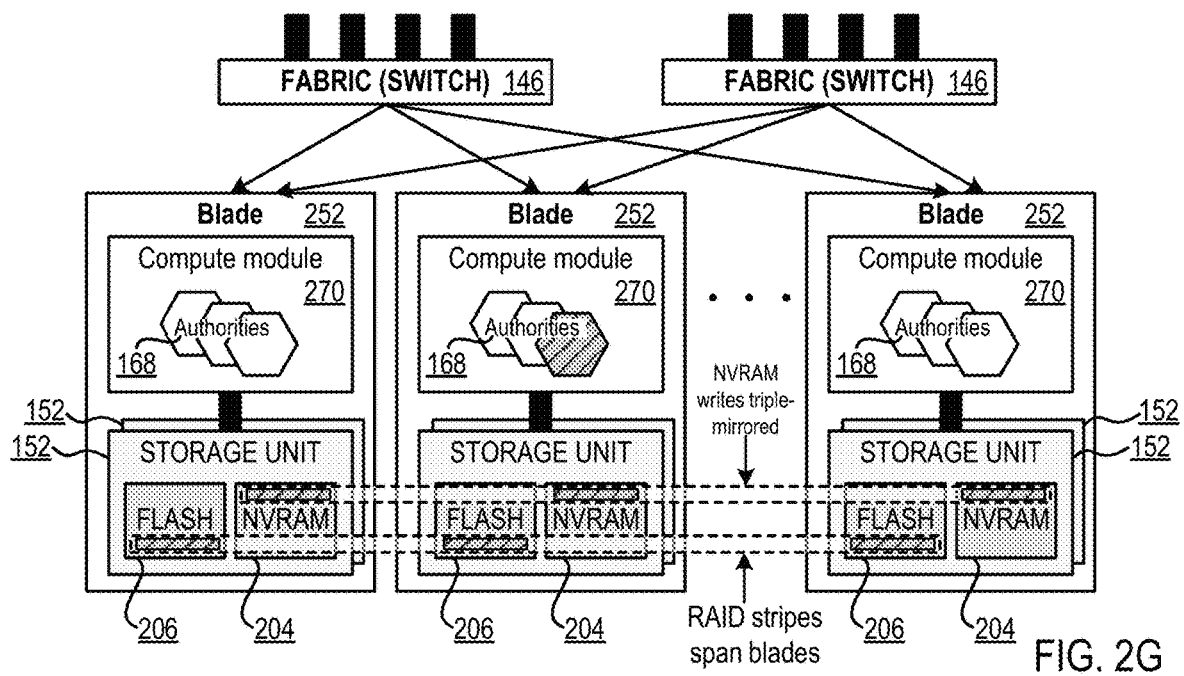
FIG. 2G depicts authorities and storage resources in blades of a storage cluster, in accordance with some embodiments.

FIG. 2G depicts authorities 168 and storage resources in blades 252 of a storage cluster, in accordance with some embodiments. Each authority 168 is exclusively responsible for a partition of the flash 206 and NVRAM 204 on each blade 252. The authority 168 manages the content and integrity of its partitions independently of other authorities 168. Authorities 168 compress incoming data and preserve it temporarily in their NVRAM 204 partitions, and then consolidate, RAID-protect, and persist the data in segments of the storage in their flash 206 partitions. As the authorities 168 write data to flash 206, storage managers 274 perform the necessary flash translation to optimize write performance and maximize media longevity. In the background, authorities 168 "garbage collect," or reclaim space occupied by data that clients have made obsolete by overwriting the data. It should be appreciated that since authorities' 168 partitions are disjoint, there is no need for distributed locking to execute client and writes or to perform background functions.

The embodiments described herein may utilize various software, communication and/or networking protocols. In addition, the configuration of the hardware and/or software may be adjusted to accommodate various protocols. For example, the embodiments may utilize Active Directory, which is a database based system that provides authentication, directory, policy, and other services in a WINDOWS™ environment. In these embodiments, LDAP (Lightweight Directory Access Protocol) is one example application protocol for querying and modifying items in directory service providers such as Active Directory. In some embodiments, a network lock manager (NLM) is utilized as a facility that works in cooperation with the Network File System (NFS) to provide a System V style of advisory file and record locking over a network. The Server Message Block (SMB) protocol, one version of which is also known as Common Internet File System (CIFS), may be integrated with the storage systems discussed herein. SMP operates as an application-layer network protocol typically used for providing shared access to files, printers, and serial ports and miscellaneous communications between nodes on a network. SMB also provides an authenticated inter-process communication mechanism. AMAZON™ S3 (Simple Storage Service) is a web service offered by Amazon Web Services, and the systems described herein may interface with Amazon S3 through web services interfaces (REST (representational state transfer), SOAP (simple object access protocol), and BitTorrent). A RESTful API (application programming interface) breaks down a transaction to create a series of small modules. Each module addresses a particular underlying part of the transaction. The control or permissions provided with these embodiments, especially for object data, may include utilization of an access control list (ACL). The ACL is a list of permissions attached to an object and the ACL specifies which users or system processes are granted access to objects, as well as what operations are allowed on given objects. The systems may utilize Internet Protocol version 6 (IPv6), as well as IPv4, for the communications protocol that provides an identification and location system for computers on networks and routes traffic across the Internet. The routing of packets between networked systems may include Equal-cost multi-path routing (ECMP), which is a routing strategy where next-hop packet forwarding to a single destination can occur over multiple "best paths" which tie for top place in routing metric calculations. Multi-path routing can be used in conjunction with most routing protocols, because it is a per-hop decision limited to a single router. The software may support Multi-tenancy, which is an architecture in which a single instance of a software application serves multiple customers. Each customer may be referred to as a tenant. Tenants may be given the ability to customize some parts of the application, but may not customize the application's code, in some embodiments. The embodiments may maintain audit logs. An audit log is a document that records an event in a computing system. In addition to documenting what resources were accessed, audit log entries typically include destination and source addresses, a timestamp, and user login information for compliance with various regulations. The embodiments may support various key management policies, such as encryption key rotation. In addition, the system may support dynamic root passwords or some variation dynamically changing passwords.

Figure 3A:
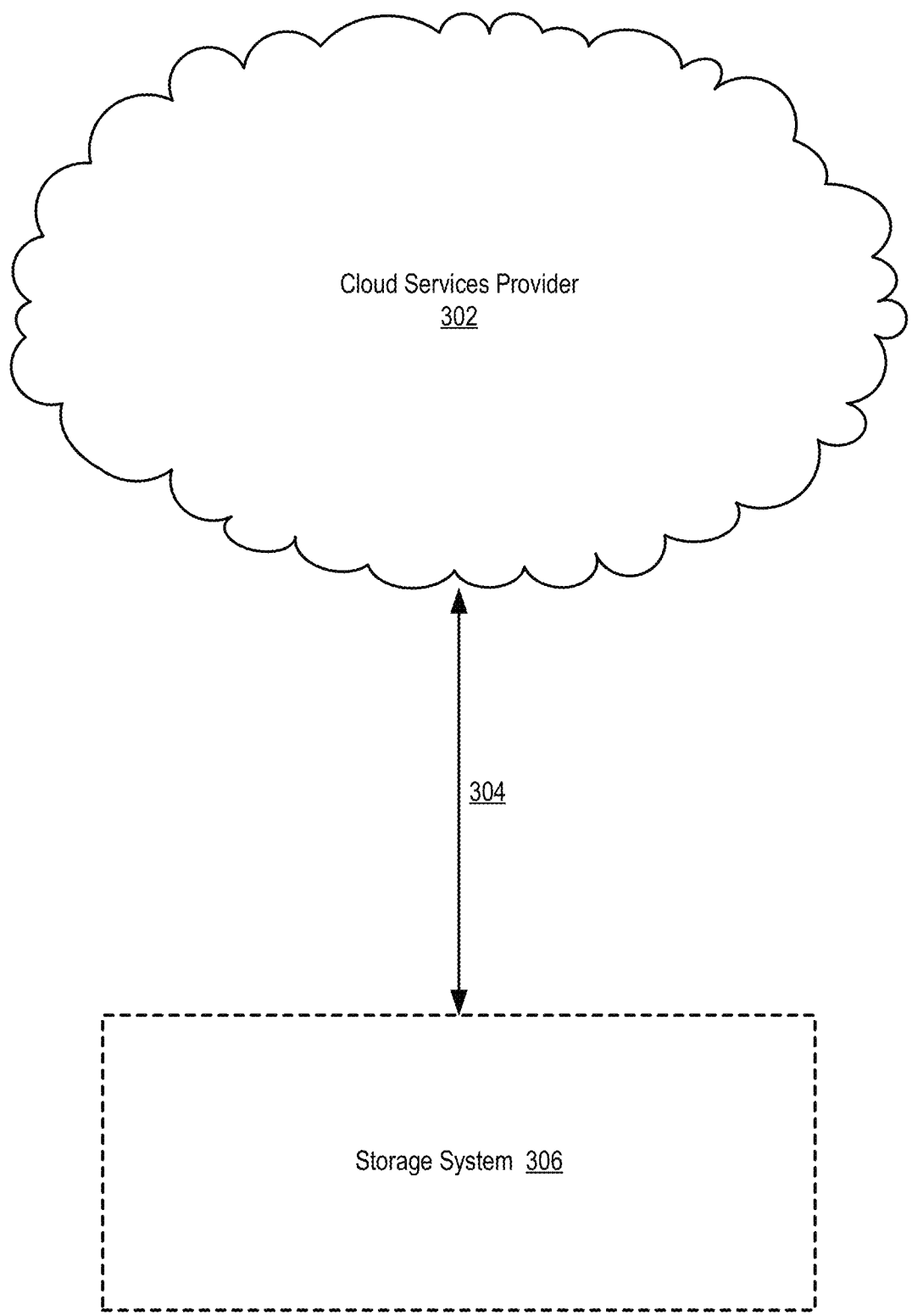
FIG. 3A sets forth a diagram of a storage system that is coupled for data communications with a cloud services provider in accordance with some embodiments of the present disclosure.

FIG. 3A sets forth a diagram of a storage system 306 that is coupled for data communications with a cloud services provider 302 in accordance with some embodiments of the present disclosure. Although depicted in less detail, the storage system 306 depicted in FIG. 3A may be similar to the storage systems described above with reference to FIGS. 1A-1D and FIGS. 2A-2G. In some embodiments, the storage system 306 depicted in FIG. 3A may be embodied as a storage system that includes imbalanced active/active controllers, as a storage system that includes balanced active/active controllers, as a storage system that includes active/active controllers where less than all of each controller's resources are utilized such that each controller has reserve resources that may be used to support failover, as a storage system that includes fully active/active controllers, as a storage system that includes dataset-segregated controllers, as a storage system that includes dual-layer architectures with front-end controllers and back-end integrated storage controllers, as a storage system that includes scale-out clusters of dual-controller arrays, as well as combinations of such embodiments.

In the example depicted in FIG. 3A, the storage system 306 is coupled to the cloud services provider 302 via a data communications link 304. The data communications link 304 may be embodied as a dedicated data communications link, as a data communications pathway that is provided through the use of one or data communications networks such as a wide area network (WAN') or local area network ('LAN'), or as some other mechanism capable of transporting digital information between the storage system 306 and the cloud services provider 302. Such a data communications link 304 may be fully wired, fully wireless, or some aggregation of wired and wireless data communications pathways. In such an example, digital information may be exchanged between the storage system 306 and the cloud services provider 302 via the data communications link 304 using one or more data communications protocols. For example, digital information may be exchanged between the storage system 306 and the cloud services provider 302 via the data communications link 304 using the handheld device transfer protocol ('HDTP'), hypertext transfer protocol ('HTTP'), internet protocol ('IP'), real-time transfer protocol ('RTP'), transmission control protocol ('TCP'), user datagram protocol ('UDP'), wireless application protocol ('WAP'), or other protocol.

The cloud services provider 302 depicted in FIG. 3A may be embodied, for example, as a system and computing environment that provides services to users of the cloud services provider 302 through the sharing of computing resources via the data communications link 304. The cloud services provider 302 may provide on-demand access to a shared pool of configurable computing resources such as computer networks, servers, storage, applications and services, and so on. The shared pool of configurable resources may be rapidly provisioned and released to a user of the cloud services provider 302 with minimal management effort. Generally, the user of the cloud services provider 302 is unaware of the exact computing resources utilized by the cloud services provider 302 to provide the services. Although in many cases such a cloud services provider 302 may be accessible via the Internet, readers of skill in the art will recognize that any system that abstracts the use of shared resources to provide services to a user through any data communications link may be considered a cloud services provider 302.

In the example depicted in FIG. 3A, the cloud services provider 302 may be configured to provide a variety of services to the storage system 306 and users of the storage system 306 through the implementation of various service models. For example, the cloud services provider 302 may be configured to provide services to the storage system 306 and users of the storage system 306 through the implementation of an infrastructure as a service ('IaaS') service model where the cloud services provider 302 offers computing infrastructure such as virtual machines and other resources as a service to subscribers. In addition, the cloud services provider 302 may be configured to provide services to the storage system 306 and users of the storage system 306 through the implementation of a platform as a service ('PaaS') service model where the cloud services provider 302 offers a development environment to application developers. Such a development environment may include, for example, an operating system, programming-language execution environment, database, web server, or other components that may be utilized by application developers to develop and run software solutions on a cloud platform. Furthermore, the cloud services provider 302 may be configured to provide services to the storage system 306 and users of the storage system 306 through the implementation of a software as a service ('SaaS') service model where the cloud services provider 302 offers application software, databases, as well as the platforms that are used to run the applications to the storage system 306 and users of the storage system 306, providing the storage system 306 and users of the storage system 306 with on-demand software and eliminating the need to install and run the application on local computers, which may simplify maintenance and support of the application. The cloud services provider 302 may be further configured to provide services to the storage system 306 and users of the storage system 306 through the implementation of an authentication as a service ('AaaS') service model where the cloud services provider 302 offers authentication services that can be used to secure access to applications, data sources, or other resources. The cloud services provider 302 may also be configured to provide services to the storage system 306 and users of the storage system 306 through the implementation of a storage as a service service model where the cloud services provider 302 offers access to its storage infrastructure for use by the storage system 306 and users of the storage system 306. Readers will appreciate that the cloud services provider 302 may be configured to provide additional services to the storage system 306 and users of the storage system 306 through the implementation of additional service models, as the service models described above are included only for explanatory purposes and in no way represent a limitation of the services that may be offered by the cloud services provider 302 or a limitation as to the service models that may be implemented by the cloud services provider 302.

In the example depicted in FIG. 3A, the cloud services provider 302 may be embodied, for example, as a private cloud, as a public cloud, or as a combination of a private cloud and public cloud. In an embodiment in which the cloud services provider 302 is embodied as a private cloud, the cloud services provider 302 may be dedicated to providing services to a single organization rather than providing services to multiple organizations. In an embodiment where the cloud services provider 302 is embodied as a public cloud, the cloud services provider 302 may provide services to multiple organizations. Public cloud and private cloud deployment models may differ and may come with various advantages and disadvantages. For example, because a public cloud deployment involves the sharing of a computing infrastructure across different organization, such a deployment may not be ideal for organizations with security concerns, mission-critical workloads, uptime requirements demands, and so on. While a private cloud deployment can address some of these issues, a private cloud deployment may require on-premises staff to manage the private cloud. In still alternative embodiments, the cloud services provider 302 may be embodied as a mix of a private and public cloud services with a hybrid cloud deployment.

Although not explicitly depicted in FIG. 3A, readers will appreciate that additional hardware components and additional software components may be necessary to facilitate the delivery of cloud services to the storage system 306 and users of the storage system 306. For example, the storage system 306 may be coupled to (or even include) a cloud storage gateway. Such a cloud storage gateway may be embodied, for example, as hardware-based or software-based appliance that is located on premise with the storage system 306. Such a cloud storage gateway may operate as a bridge between local applications that are executing on the storage array 306 and remote, cloud-based storage that is utilized by the storage array 306. Through the use of a cloud storage gateway, organizations may move primary iSCSI or NAS to the cloud services provider 302, thereby enabling the organization to save space on their on-premises storage systems. Such a cloud storage gateway may be configured to emulate a disk array, a block-based device, a file server, or other storage system that can translate the SCSI commands, file server commands, or other appropriate command into REST-space protocols that facilitate communications with the cloud services provider 302.

In order to enable the storage system 306 and users of the storage system 306 to make use of the services provided by the cloud services provider 302, a cloud migration process may take place during which data, applications, or other elements from an organization's local systems (or even from another cloud environment) are moved to the cloud services provider 302. In order to successfully migrate data, applications, or other elements to the cloud services provider's 302 environment, middleware such as a cloud migration tool may be utilized to bridge gaps between the cloud services provider's 302 environment and an organization's environment. Such cloud migration tools may also be configured to address potentially high network costs and long transfer times associated with migrating large volumes of data to the cloud services provider 302, as well as addressing security concerns associated with sensitive data to the cloud services provider 302 over data communications networks. In order to further enable the storage system 306 and users of the storage system 306 to make use of the services provided by the cloud services provider 302, a cloud orchestrator may also be used to arrange and coordinate automated tasks in pursuit of creating a consolidated process or workflow. Such a cloud orchestrator may perform tasks such as configuring various components, whether those components are cloud components or on-premises components, as well as managing the interconnections between such components. The cloud orchestrator can simplify the inter-component communication and connections to ensure that links are correctly configured and maintained.

In the example depicted in FIG. 3A, and as described briefly above, the cloud services provider 302 may be configured to provide services to the storage system 306 and users of the storage system 306 through the usage of a SaaS service model where the cloud services provider 302 offers application software, databases, as well as the platforms that are used to run the applications to the storage system 306 and users of the storage system 306, providing the storage system 306 and users of the storage system 306 with on-demand software and eliminating the need to install and run the application on local computers, which may simplify maintenance and support of the application. Such applications may take many forms in accordance with various embodiments of the present disclosure. For example, the cloud services provider 302 may be configured to provide access to data analytics applications to the storage system 306 and users of the storage system 306. Such data analytics applications may be configured, for example, to receive telemetry data phoned home by the storage system 306. Such telemetry data may describe various operating characteristics of the storage system 306 and may be analyzed, for example, to determine the health of the storage system 306, to identify workloads that are executing on the storage system 306, to predict when the storage system 306 will run out of various resources, to recommend configuration changes, hardware or software upgrades, workflow migrations, or other actions that may improve the operation of the storage system 306.

The cloud services provider 302 may also be configured to provide access to virtualized computing environments to the storage system 306 and users of the storage system 306. Such virtualized computing environments may be embodied, for example, as a virtual machine or other virtualized computer hardware platforms, virtual storage devices, virtualized computer network resources, and so on. Examples of such virtualized environments can include virtual machines that are created to emulate an actual computer, virtualized desktop environments that separate a logical desktop from a physical machine, virtualized file systems that allow uniform access to different types of concrete file systems, and many others.

Figure 3B:
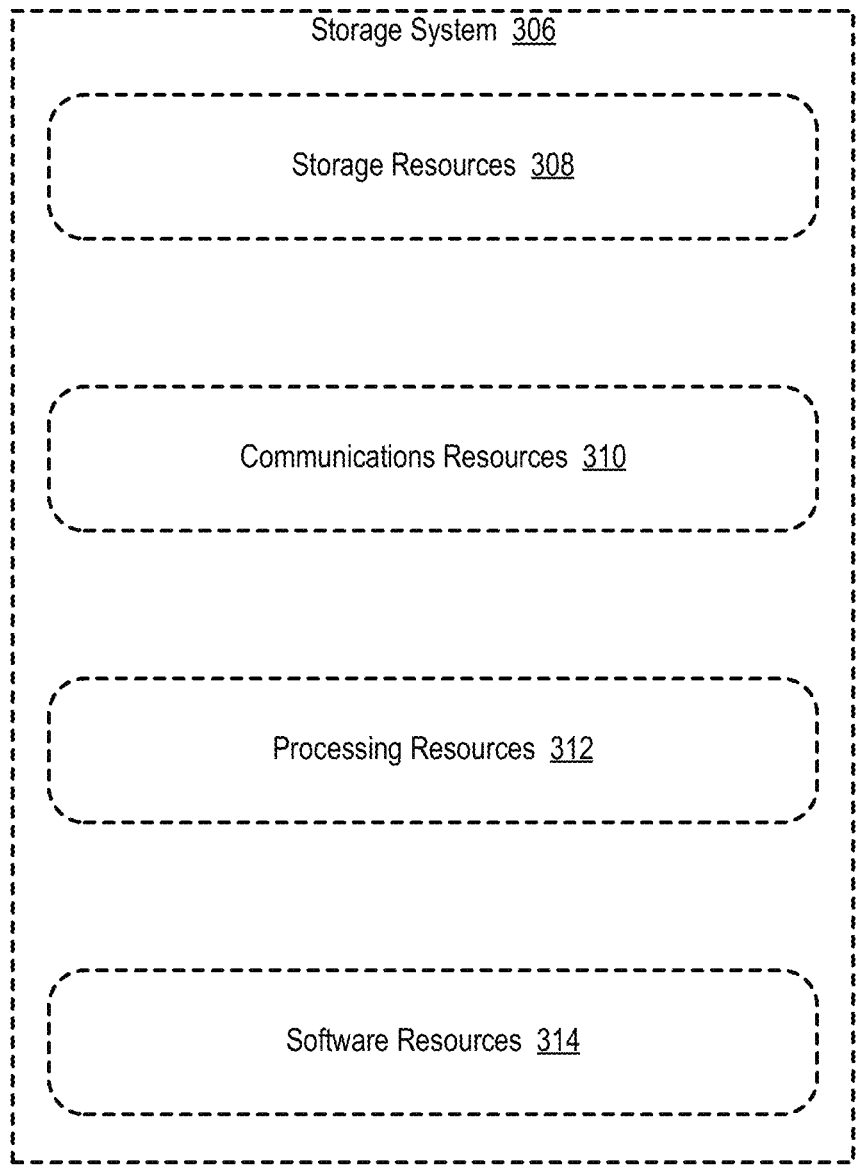
FIG. 3B sets forth a diagram of a storage system in accordance with some embodiments of the present disclosure.

For further explanation, FIG. 3B sets forth a diagram of a storage system 306 in accordance with some embodiments of the present disclosure. Although depicted in less detail, the storage system 306 depicted in FIG. 3B may be similar to the storage systems described above with reference to FIGS. 1A-1D and FIGS. 2A-2G as the storage system may include many of the components described above.

The storage system 306 depicted in FIG. 3B may include storage resources 308, which may be embodied in many forms. For example, in some embodiments the storage resources 308 can include nano-RAM or another form of nonvolatile random access memory that utilizes carbon nanotubes deposited on a substrate. In some embodiments, the storage resources 308 may include 3D crosspoint non-volatile memory in which bit storage is based on a change of bulk resistance, in conjunction with a stackable cross-gridded data access array. In some embodiments, the storage resources 308 may include flash memory, including single-level cell ('SLC') NAND flash, multi-level cell ('MLC') NAND flash, triple-level cell (TLC') NAND flash, quad-level cell ('QLC') NAND flash, and others. In some embodiments, the storage resources 308 may include non-volatile magnetoresistive random-access memory ('MRAM'), including spin transfer torque ('STT') MRAM, in which data is stored through the use of magnetic storage elements. In some embodiments, the example storage resources 308 may include non-volatile phase-change memory ('PCM') that may have the ability to hold multiple bits in a single cell as cells can achieve a number of distinct intermediary states. In some embodiments, the storage resources 308 may include quantum memory that allows for the storage and retrieval of photonic quantum information. In some embodiments, the example storage resources 308 may include resistive random-access memory ('ReRAM') in which data is stored by changing the resistance across a dielectric solid-state material. In some embodiments, the storage resources 308 may include storage class memory ('SCM') in which solid-state nonvolatile memory may be manufactured at a high density using some combination of sub-lithographic patterning techniques, multiple bits per cell, multiple layers of devices, and so on. Readers will appreciate that other forms of computer memories and storage devices may be utilized by the storage systems described above, including DRAM, SRAM, EEPROM, universal memory, and many others. The storage resources 308 depicted in FIG. 3A may be embodied in a variety of form factors, including but not limited to, dual in-line memory modules ('DIMMs'), non-volatile dual in-line memory modules ('NVDIMMs'), M.2, U.2, and others.

The example storage system 306 depicted in FIG. 3B may implement a variety of storage architectures. For example, storage systems in accordance with some embodiments of the present disclosure may utilize block storage where data is stored in blocks, and each block essentially acts as an individual hard drive. Storage systems in accordance with some embodiments of the present disclosure may utilize object storage, where data is managed as objects. Each object may include the data itself, a variable amount of metadata, and a globally unique identifier, where object storage can be implemented at multiple levels (e.g., device level, system level, interface level). Storage systems in accordance with some embodiments of the present disclosure utilize file storage in which data is stored in a hierarchical structure. Such data may be saved in files and folders, and presented to both the system storing it and the system retrieving it in the same format.

The example storage system 306 depicted in FIG. 3B may be embodied as a storage system in which additional storage resources can be added through the use of a scale-up model, additional storage resources can be added through the use of a scale-out model, or through some combination thereof. In a scale-up model, additional storage may be added by adding additional storage devices. In a scale-out model, however, additional storage nodes may be added to a cluster of storage nodes, where such storage nodes can include additional processing resources, additional networking resources, and so on.

The storage system 306 depicted in FIG. 3B also includes communications resources 310 that may be useful in facilitating data communications between components within the storage system 306, as well as data communications between the storage system 306 and computing devices that are outside of the storage system 306. The communications resources 310 may be configured to utilize a variety of different protocols and data communication fabrics to facilitate data communications between components within the storage systems as well as computing devices that are outside of the storage system. For example, the communications resources 310 can include fibre channel ('FC') technologies such as FC fabrics and FC protocols that can transport SCSI commands over FC networks. The communications resources 310 can also include FC over ethernet ('FCoE') technologies through which FC frames are encapsulated and transmitted over Ethernet networks. The communications resources 310 can also include InfiniBand ('IB') technologies in which a switched fabric topology is utilized to facilitate transmissions between channel adapters. The communications resources 310 can also include NVM Express ('NVMe') technologies and NVMe over fabrics ('NVMeoF') technologies through which non-volatile storage media attached via a PCI express ('PCIe') bus may be accessed. The communications resources 310 can also include mechanisms for accessing storage resources 308 within the storage system 306 utilizing serial attached SCSI ('SAS'), serial ATA ('SATA') bus interfaces for connecting storage resources 308 within the storage system 306 to host bus adapters within the storage system 306, internet small computer systems interface ('iSCSI') technologies to provide block-level access to storage resources 308 within the storage system 306, and other communications resources that that may be useful in facilitating data communications between components within the storage system 306, as well as data communications between the storage system 306 and computing devices that are outside of the storage system 306.

The storage system 306 depicted in FIG. 3B also includes processing resources 312 that may be useful in useful in executing computer program instructions and performing other computational tasks within the storage system 306. The processing resources 312 may include one or more application-specific integrated circuits ('ASICs') that are customized for some particular purpose as well as one or more central processing units ('CPUs'). The processing resources 312 may also include one or more digital signal processors ('DSPs'), one or more field-programmable gate arrays ('FPGAs'), one or more systems on a chip ('SoCs'), or other form of processing resources 312. The storage system 306 may utilize the storage resources 312 to perform a variety of tasks including, but not limited to, supporting the execution of software resources 314 that will be described in greater detail below.

The storage system 306 depicted in FIG. 3B also includes software resources 314 that, when executed by processing resources 312 within the storage system 306, may perform various tasks. The software resources 314 may include, for example, one or more modules of computer program instructions that when executed by processing resources 312 within the storage system 306 are useful in carrying out various data protection techniques to preserve the integrity of data that is stored within the storage systems. Readers will appreciate that such data protection techniques may be carried out, for example, by system software executing on computer hardware within the storage system, by a cloud services provider, or in other ways. Such data protection techniques can include, for example, data archiving techniques that cause data that is no longer actively used to be moved to a separate storage device or separate storage system for long-term retention, data backup techniques through which data stored in the storage system may be copied and stored in a distinct location to avoid data loss in the event of equipment failure or some other form of catastrophe with the storage system, data replication techniques through which data stored in the storage system is replicated to another storage system such that the data may be accessible via multiple storage systems, data snapshotting techniques through which the state of data within the storage system is captured at various points in time, data and database cloning techniques through which duplicate copies of data and databases may be created, and other data protection techniques. Through the use of such data protection techniques, business continuity and disaster recovery objectives may be met as a failure of the storage system may not result in the loss of data stored in the storage system.

The software resources 314 may also include software that is useful in implementing software-defined storage ('SDS'). In such an example, the software resources 314 may include one or more modules of computer program instructions that, when executed, are useful in policy-based provisioning and management of data storage that is independent of the underlying hardware. Such software resources 314 may be useful in implementing storage virtualization to separate the storage hardware from the software that manages the storage hardware.

The software resources 314 may also include software that is useful in facilitating and optimizing I/O operations that are directed to the storage resources 308 in the storage system 306. For example, the software resources 314 may include software modules that perform carry out various data reduction techniques such as, for example, data compression, data deduplication, and others. The software resources 314 may include software modules that intelligently group together I/O operations to facilitate better usage of the underlying storage resource 308, software modules that perform data migration operations to migrate from within a storage system, as well as software modules that perform other functions. Such software resources 314 may be embodied as one or more software containers or in many other ways.

Readers will appreciate that the various components depicted in FIG. 3B may be grouped into one or more optimized computing packages as converged infrastructures.

Such converged infrastructures may include pools of computers, storage and networking resources that can be shared by multiple applications and managed in a collective manner using policy-driven processes. Such converged infrastructures may minimize compatibility issues between various components within the storage system 306 while also reducing various costs associated with the establishment and operation of the storage system 306. Such converged infrastructures may be implemented with a converged infrastructure reference architecture, with standalone appliances, with a software driven hyper-converged approach, or in other ways.

Readers will appreciate that the storage system 306 depicted in FIG. 3B may be useful for supporting various types of software applications. For example, the storage system 306 may be useful in supporting artificial intelligence applications, database applications, DevOps projects, electronic design automation tools, event-driven software applications, high performance computing applications, simulation applications, high-speed data capture and analysis applications, machine learning applications, media production applications, media serving applications, picture archiving and communication systems ('PACS') applications, software development applications, and many other types of applications by providing storage resources to such applications.

The storage systems described above may operate to support a wide variety of applications. In view of the fact that the storage systems include compute resources, storage resources, and a wide variety of other resources, the storage systems may be well suited to support applications that are resource intensive such as, for example, artificial intelligence applications. Such artificial intelligence applications may enable devices to perceive their environment and take actions that maximize their chance of success at some goal. The storage systems described above may also be well suited to support other types of applications that are resource intensive such as, for example, machine learning applications. Machine learning applications may perform various types of data analysis to automate analytical model building. Using algorithms that iteratively learn from data, machine learning applications can enable computers to learn without being explicitly programmed.

In addition to the resources already described, the storage systems described above may also include graphics processing units ('GPUs'), occasionally referred to as visual processing unit ('VPUs'). Such GPUs may be embodied as specialized electronic circuits that rapidly manipulate and alter memory to accelerate the creation of images in a frame buffer intended for output to a display device. Such GPUs may be included within any of the computing devices that are part of the storage systems described above.

Figure 4:
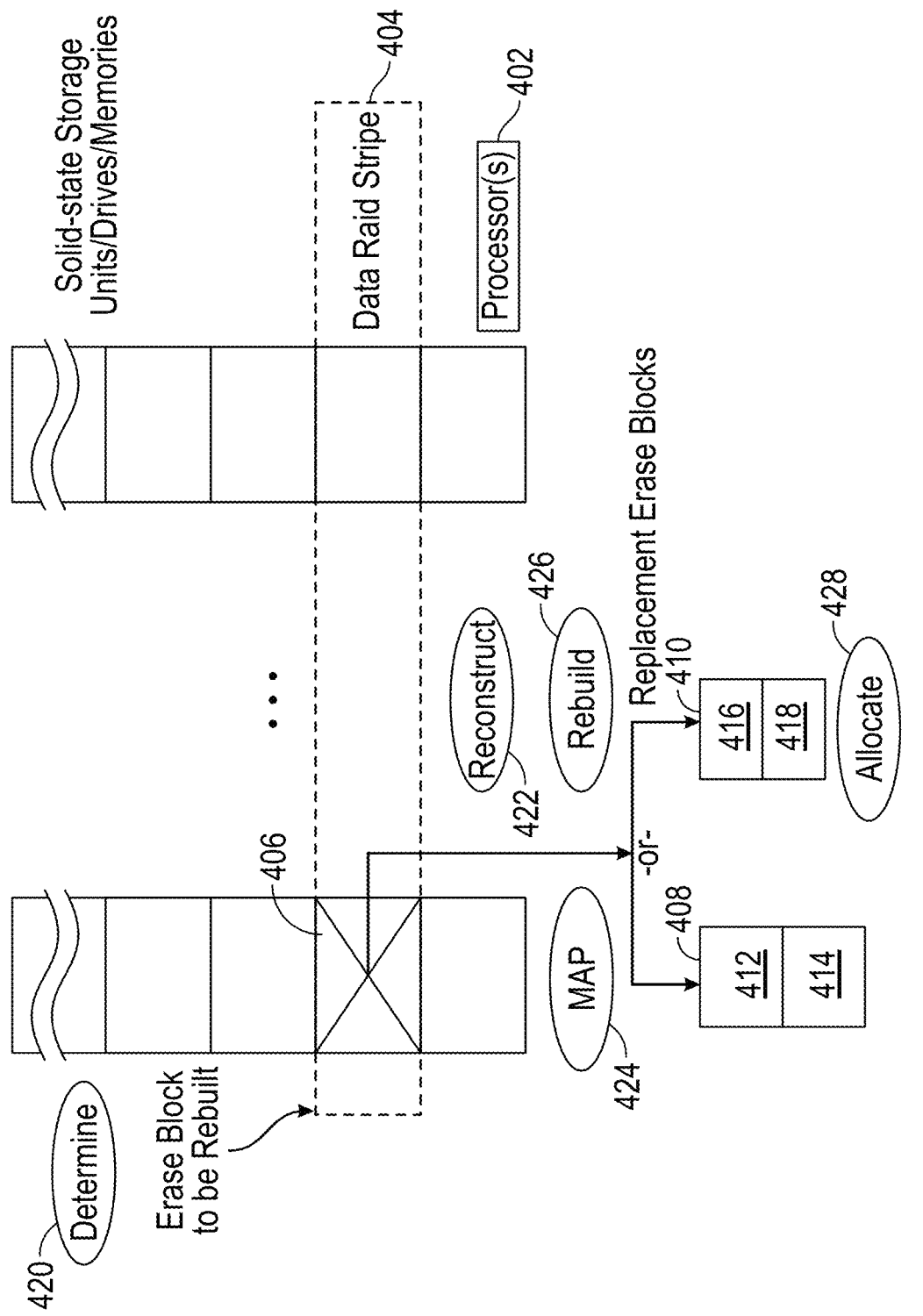
FIG. 4 depicts a storage system rebuilding an erase block into a replacement erase block in accordance with some embodiments.

FIG. 4 depicts a storage system rebuilding an erase block into a replacement erase block. In various scenarios, rebuilding an erase block is triggered by failure of a solid-state storage drive, storage unit, storage node or blade, in a storage array or storage cluster, or other portion of a solid-state storage memory in a storage system. Rebuilding could also be triggered by replacement or upgrade of a portion of solid-state storage memory. The original data, in the lost portion of solid-state storage memory in these scenarios, is no longer available and must be rebuilt. Generally, rebuilding makes use of error coding, and one or more processors 402, for example from storage nodes, blades, storage units, a storage cluster or a storage array, perform the operations to rebuild 426 the data. Based on the trigger for the rebuilding, the processor(s) 402 determine 420 the erase block(s) 406 to be rebuilt. This could be a single erase block 406, a group of erase blocks 406, or all of the erase blocks 406 on the failed or replaced portion of solid-state storage memory in some embodiments. The processor(s) 402 map 424 the erase block(s) 406 to be rebuilt to one or more replacement erase blocks 408, 416, 418, or to a portion 412 of an erase block 408. Replacement erase block(s) are allocated 428 and assigned to the data RAID stripe 404, and the mapping is recorded in metadata (see FIGS. 5, 6A and 6B).

It should be appreciated that in some embodiments, erase blocks of flash memory are referred to as allocation units (AU), and an allocation unit could be one erase block, a portion of an erase block, more than one erase block, or portions of more than one erase block, in various embodiments. A RAID stripe has a segment ID, and elements within the RAID stripe are referred to as shards.

Continuing with FIG. 4, the processor(s) 402 reconstruct 422 the data from the erase block(s) 406 to be rebuilt, for example by reading available data from the data RAID stripe 404 (e.g., from the portions of solid-state storage memory that have not failed nor been replaced) and using error coding to recover the now missing data (e.g., from the portion of solid-state storage memory that has failed or been replaced). The reconstructed data is then written into the replacement erase block 408, a portion 412 of the replacement erase block 408, or multiple replacement erase blocks 416, 418 organized as a group 410 of replacement erase blocks 416, 418. In various embodiments, these actions can be performed for one erase block 406 to be rebuilt, at a time, groups of erase blocks 406 to be rebuilt, or all of the erase blocks 406 to be rebuilt from the failed or replaced solid-state storage unit, drive, memory, etc. Some embodiments of a storage system consider all failed erase blocks, rather than one at a time, and thus minimize wasted space.

Figure 5:
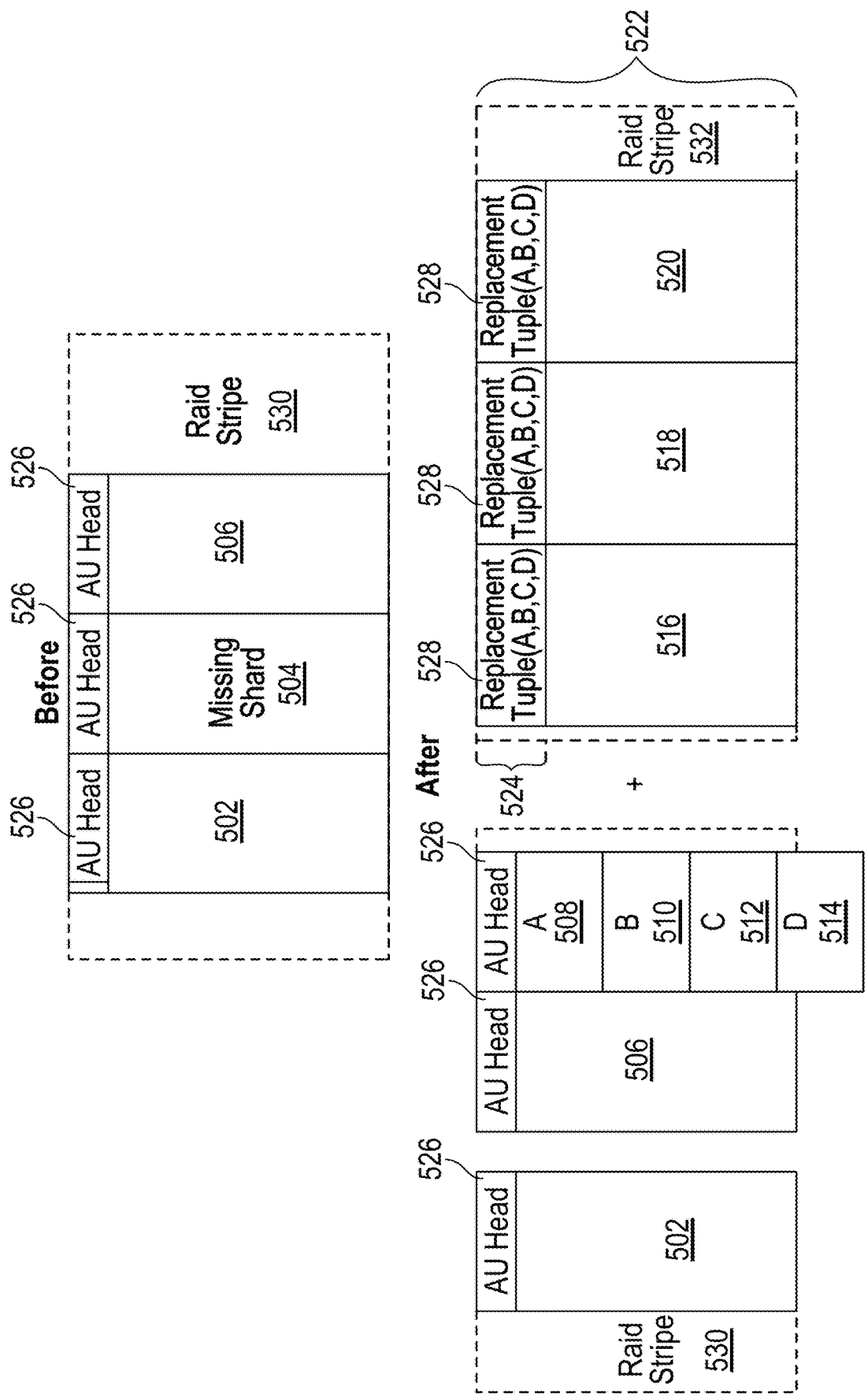
FIG. 5 depicts replacement erase blocks holding rebuilt data, and metadata that indicates mapping of logical addresses for the rebuilt data, in a RAID stripe in accordance with some embodiments.

FIG. 5 depicts replacement erase blocks 508, 510, 512, 514 holding rebuilt data, and metadata that indicates mapping of logical addresses for the rebuilt data, in a RAID stripe 530. At the top of FIG. 5, three allocation units 502, 504, 506, each composed of an erase block, are shown as the "before" scenario. When a portion of the solid-state storage memory fails or is replaced, the middle allocation unit 504 becomes a missing shard in the data RAID stripe 530.

At the bottom of FIG. 5, the two remaining allocation units 502, 506 are shown, with data accessible for the rebuild 426. However, the missing shard, i.e., the allocation unit 504 that has failed or been replaced, is no longer present, in the "after" scenario. The reconstructed data, from the missing shard, is written into replacement erase blocks 508, 510, 512, 514. In this example, the replacement erase blocks 508, 510, 512, 514 have a cumulative amount of memory space greater than the erase block size of the missing shard or allocation unit 504 that has failed or been replaced. Remaining unused memory space in one (or more) of the erase blocks 514 can be left unoccupied, or allocated to another data stripe (i.e., RAID stripe). Allocating unused memory space to another data stripe solves a problem of wasteful or inefficient use of memory space that can arise when erase block sizes change.

Still referring to FIG. 5, another problem arises when the replacement erase blocks 508, 510, 512, 514 are not the same size as the erase block of the missing shard or allocation unit 504. While the first replacement block 508 starts with the same metadata 526 (in this example, an allocation unit header) as the failed erase block being replaced, subsequent replacement erase blocks 510, 512, 514 start with data from the middle of the failed erase block. Ordinarily, without the solution presented next, the system would look to the beginning of each of these subsequent replacement erase blocks 510, 512, 514 and expect to find metadata that represents the state, e.g., live or obsolete, of the data in the remainder of the erase block 510, 512, 514. However, such metadata is not present, in the embodiment shown. Instead, the metadata 526 at the beginning of the first replacement erase block 508 is augmented by further metadata 528 written to a further RAID stripe 532 in a group 522 of erase blocks 516, 518, 520. In the embodiment shown, this augmented metadata 528 is written starting at the beginning of each of these erase blocks 516, 518, 520 in the additional RAID stripe 532. The augmented metadata 528 represents the partial nature of the replacement erase blocks 508, 510, 512, 514, and specifies state of the data, whether live or obsolete, and also addressing information, examples of which are shown in FIGS. 6A and 6B.

Figure 6A:
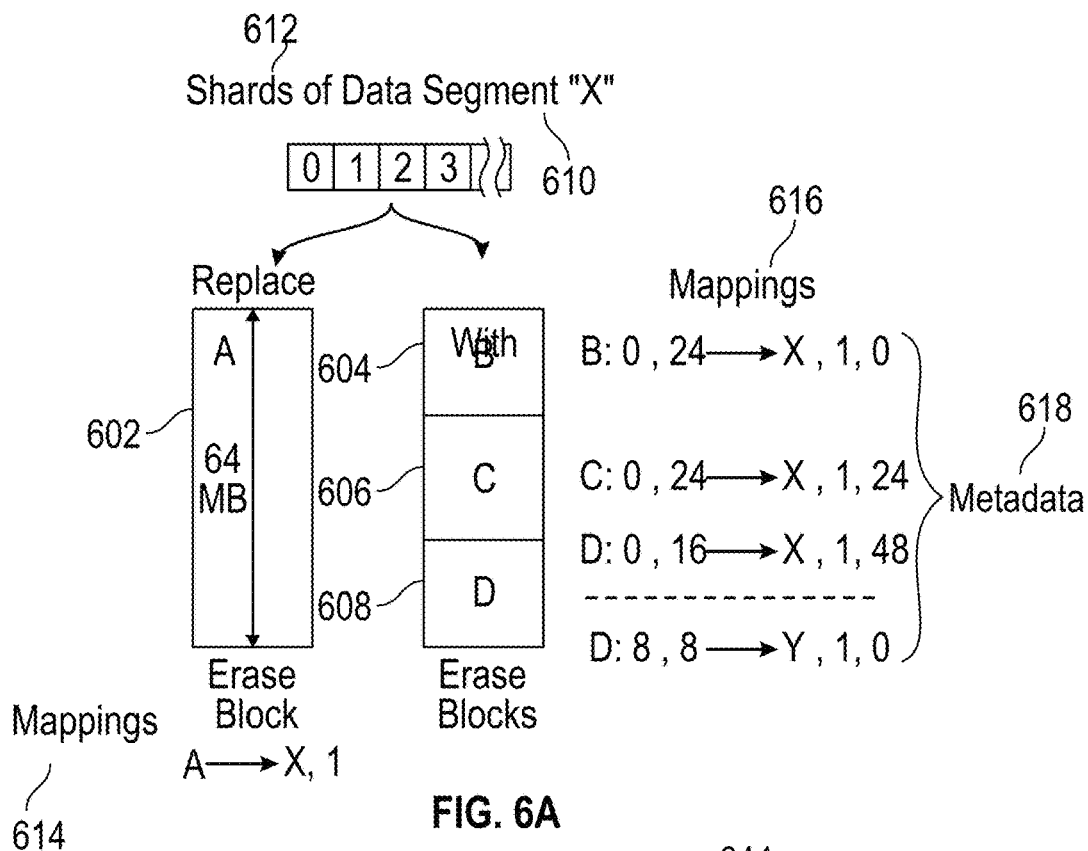
FIG. 6A depicts a scheme for the metadata that maps the logical addresses for the rebuilt data in accordance with some embodiments.
Figure 6B:
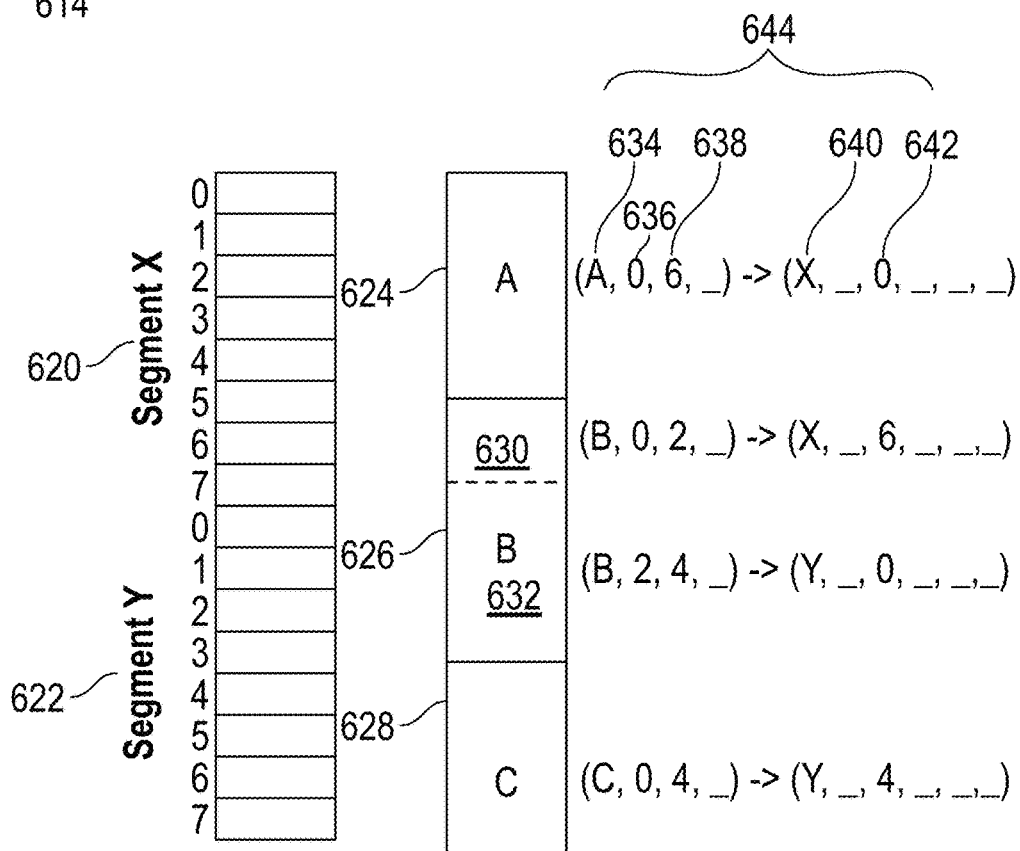
FIG. 6B depicts a further example of a scheme for the metadata that maps the logical addresses for the rebuilt data in accordance with some embodiments.

FIG. 6A depicts a scheme for the metadata 618 that maps the logical addresses for the rebuilt data. One important part of the system is updating the addressing metadata used to map a logical address to an erase block. In one embodiment, the metadata format maps an erase block (e.g., allocation unit or AU) to a RAID stripe (which has a segment ID) and element (e.g., a shard) within that RAID stripe. To this is added three fields: an offset within the AU, a length within the AU, and an offset within the stripe (e.g., segio).

For example, consider replacing a single 64 MB erase block 602 A that points to a segment 610 labeled X, shard 612 labeled 1 with three 24 MB erase blocks 604, 606, 608 labeled B, C, and D. Previously, there would be one mapping 614 of the form A->X, 1. After the replacement, there are three mappings 616:

B, 0, 24->X, 1, 0; that is, erase block B begins the replacement of shard 1 in segment X and continues for 24 MB.

C, 0, 24->X, 1, 24; that is, erase block C continues the replacement of shard 1 in segment X, starting at 24 MB in shard 1 in segment X and continuing for 24 MB.

D, 0, 16->X, 1, 48; that is, erase block D finishes the replacement using 16 MB from erase block D.

Further, erase block D can be used to replace another failed erase block from segment Y, also shard 1. The mapping would be:

D, 16, 8->Y, 1, 0; that is, erase block D begins the replacement of shard 1 in segment Y, starting at 16 MB in erase block D and continuing for 8 MB.

This augmented mapping system allows the storage system to replace original failed erase blocks with a collection of smaller erase blocks, a portion of a larger erase block, or some combination. Also, there is the problem that the replacement erase blocks may not start with metadata indicating the erase block contains live data. In the example above, block B will start with such metadata but C and D will not. This is addressed this by rewriting this metadata to a new RAID stripe (see FIG. 6B). Therefore, even though some of the replacement blocks do not start with metadata, they are pointed to by other blocks that do.

FIG. 6B depicts a further example of a scheme for the metadata that maps the logical addresses for the rebuilt data. Data segments 620, 622 (e.g., from RAID stripes) labeled X and Y are depicted vertically (rather than horizontally as in FIG. 6A), and have numbered offsets 646 labeled 0-7. The two data segments 620, 622 could be from different RAID stripes in some embodiments. Erase blocks 624, 626, 628 labeled A, B and C are replacement erase blocks. Metadata 644 records the mapping from the data segments 620, 622 to the replacement erase blocks 624, 626, 628. Underscores indicate further metadata that is not shown in the example.

In the metadata 644 for the replacement block 624 labeled A, a block identifier 634 has the value A, an offset 636 has the value 0, an extent 638 (or length) has the value 6, for 6 MB, a segment identifier 640 has the value X, and a segment offset 642 has the value 0. This line of metadata 644 is interpreted as indicating block A starts at offset 0 in the block, extends for 6 MB, and maps to segment X starting with offset 0.

Continuing with FIG. 6B, metadata 644, for the upper portion 630 of the replacement block 624 labeled B indicates that block B starts at offset zero within block B, extends for 2 MB (i.e., that portion of data has 2 MB length), and maps to segment X at offset 6. Metadata 644, for the lower portion 632 of the replacement block 624 labeled B indicates that further data starts at Block B offset 2 and extending for 4 MB, and maps to segment Y at offset 0. Metadata 644 for the replacement block 628 labeled C indicates that block C starts at offset 0, extends for 4 MB, and maps to segment Y at offset 4.

Figure 7:
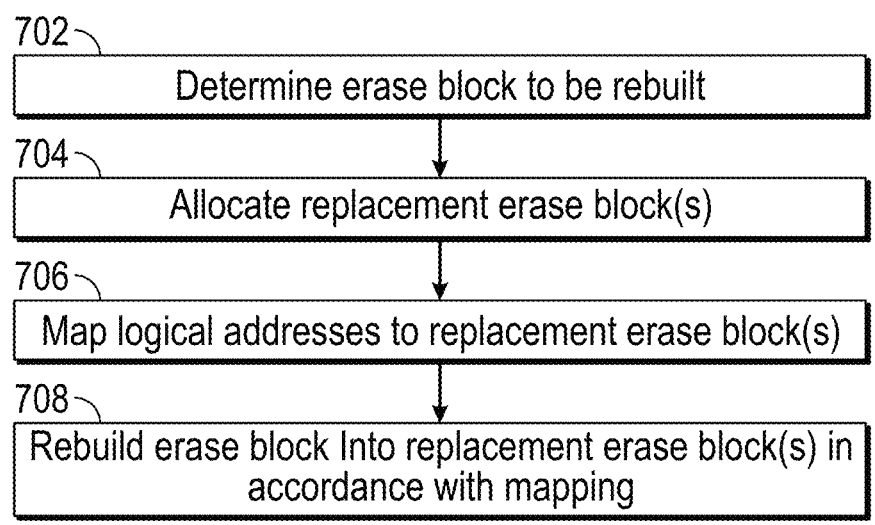
FIG. 7 is a flow diagram of a method for rebuilding data when changing erase block sizes, which can be practiced by embodiments of storage systems described herein, and more specifically by processors of storage systems in accordance with some embodiments.

FIG. 7 is a flow diagram of a method for rebuilding data when changing erase block sizes, which can be practiced by embodiments of storage systems described herein, and more specifically by processors of storage systems. An event such as a failure or replacement of a portion of solid-state storage memory triggers the rebuilding. In an action 702, an erase block to be rebuilt is determined. The erase block could be considered on its own, or grouped with other erase blocks. In an action 704, one or more replacement erase blocks are allocated. The replacement erase block(s) can be of differing erase block size than the erase block(s) to be rebuilt.

In an action 706 of FIG. 7, logical addresses are mapped to the replacement erase block(s). For example, see schemes described above for metadata in FIGS. 6A and 6B. In an action 708, the erase block is rebuilt into the replacement erase block(s), in accordance with the mapping. The rebuilding includes reconstructing the data, for example using error coding, and writing the reconstructed data into the replacement erase block(s).

Figure 8:
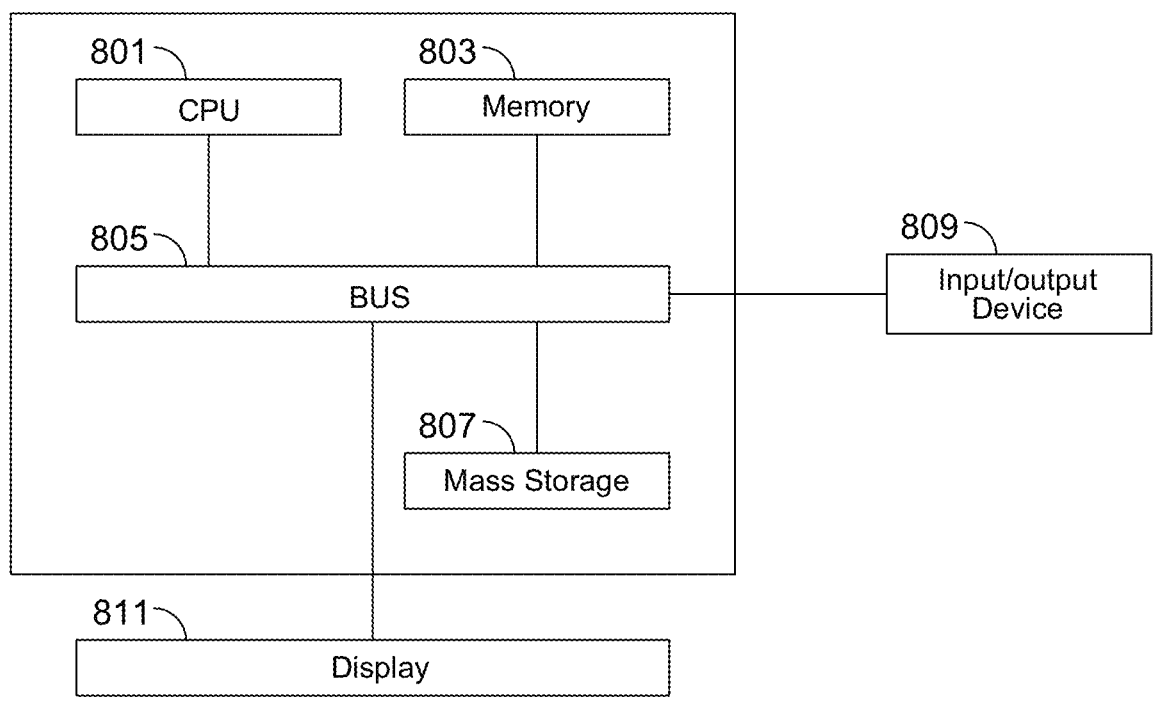
FIG. 8 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 8 is an illustration showing an exemplary computing device which may implement the embodiments described herein. The computing device of FIG. 8 may be used to perform embodiments of the functionality for rebuilding data when changing erase block sizes in accordance with some embodiments. The computing device includes a central processing unit (CPU) 801, which is coupled through a bus 805 to a memory 803, and mass storage device 807. Mass storage device 807 represents a persistent data storage device such as a disc drive, which may be local or remote in some embodiments. The mass storage device 807 could implement a backup storage, in some embodiments. Memory 803 may include read only memory, random access memory, etc. Applications resident on the computing device may be stored on or accessed via a computer readable medium such as memory 803 or mass storage device 807 in some embodiments. Applications may also be in the form of modulated electronic signals modulated accessed via a network modem or other network interface of the computing device. It should be appreciated that CPU 801 may be embodied in a general-purpose processor, a special purpose processor, or a specially programmed logic device in some embodiments.

Display 811 is in communication with CPU 801, memory 803, and mass storage device 807, through bus 805. Display 811 is configured to display any visualization tools or reports associated with the system described herein. Input/output device 809 is coupled to bus 805 in order to communicate information in command selections to CPU 801. It should be appreciated that data to and from external devices may be communicated through the input/output device 809. CPU 801 can be defined to execute the functionality described herein to enable the functionality described with reference to FIGS. 1A-7. The code embodying this functionality may be stored within memory 803 or mass storage device 807 for execution by a processor such as CPU 801 in some embodiments. The operating system on the computing device may be MS-WINDOWS™, UNIX™, LINUX™, iOS™, CentOS™, Android™, Redhat Linux™, z/OS™, or other known operating systems. It should be appreciated that the embodiments described herein may also be integrated with a virtualized computing system implemented with physical computing resources.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:
   identifying one or more erase blocks to be rebuilt;
   identifying one or more replacement erase blocks to receive rebuilt data, wherein the one or more erase blocks and the one or more replacement erase blocks have differing erase block sizes; and
   mapping logical addresses, for the one or more erase blocks, to the one or more replacement erase blocks wherein at least one of the one or more replacement erase blocks includes a block that does not start with metadata.

2. The method of claim 1, wherein the mapping the logical addresses comprises:
   mapping contents of each of the one or more erase blocks to an offset and a length within each of the one or more replacement erase blocks, and to an offset within a RAID stripe.

3. The method of claim 1, further comprising:
   writing a metadata indicating the mapping to a second RAID stripe, wherein data from the one or more erase blocks that is rebuilt into the one or more replacement erase blocks is of a first RAID stripe, wherein there is more than one replacement erase block.

4. The method of claim 1, wherein:
   each of the one or more erase blocks to be rebuilt starts with metadata that maps contents of the erase block to a RAID stripe and a shard within the RAID stripe, wherein there is more than one replacement erase block.

5. The method of claim 1, wherein the identifying the one or more erase blocks to be rebuilt is a consequence of failure, removal or replacement of a solid-state storage drive.

6. The method of claim 1, further comprising:
   mapping a further erase block to be rebuilt from a differing RAID stripe than the one or more erase blocks into the one or more replacement erase blocks.

7. The method of claim 1, wherein the rebuilding comprises:
   replacing the one or more erase blocks by the one or more replacement erase blocks, with the one or more replacement erase blocks comprising one of a plurality of smaller erase blocks, a larger erase block, a plurality of larger erase blocks, or a combination of smaller and larger erase blocks.

8. A tangible, non-transitory, computer-readable media having instructions thereupon which, when executed by a processor, cause the processor to perform a method comprising:
   allocating one or more second erase blocks, for rebuilding data from one or more first erase blocks, wherein the one or more second erase blocks have at least one differing erase block size from the one or more first erase blocks; and
   mapping logical addresses for the data from the one or more first erase blocks to the one or more second erase blocks, wherein at least one of the one or more replacement erase blocks includes a block that does not start with metadata.

9. The computer-readable media of claim 8, wherein the mapping the logical addresses for the data comprises:
   mapping the data to an offset within a RAID stripe and to an offset and a length within each of the one or more second erase blocks.

10. The computer-readable media of claim 8, wherein the method further comprises:
    writing a metadata for the mapping the logical addresses to a second RAID stripe, wherein the data from the one or more first erase blocks is in a first RAID stripe.

11. The computer-readable media of claim 8, wherein the method further comprises:
    mapping logical addresses for data from one or more third erase blocks, from a differing RAID stripe than a RAID stripe including the one or more first erase blocks, into the one or more second erase blocks; and
    writing data reconstructed from the one or more third erase blocks into the one or more second erase blocks, in accordance with the mapping for the data from the one or more third erase blocks.

12. The computer-readable media of claim 8, wherein the method further comprises reconstructing the data from a portion of a RAID stripe as a result of failure, removal or replacement of a solid-state storage memory.

13. The computer-readable media of claim 8, wherein the one or more second erase blocks comprise one of a plurality of erase blocks each having erase block size smaller than erase block size of each of the one or more first erase blocks, one or more erase blocks each having erase block size greater than erase block size of each of the one or more first erase blocks, or a plurality of erase blocks having a combination of smaller and greater erase block sizes.

14. A storage system, comprising:
   storage memory having erase blocks; and
   at least one processor, configurable to:
      allocate replacement erase blocks, including erase blocks having erase block sizes differing from erase block sizes of erase blocks to be rebuilt;
      map logical addresses from the erase blocks to be rebuilt to the replacement erase blocks, wherein at least one of the one or more replacement erase blocks includes a block that does not start with metadata; and
      rebuild data from the erase blocks to be rebuilt into the replacement erase blocks, in accordance with such mapping.

15. The storage system of claim 14, wherein to rebuild the data into the replacement erase blocks comprises to map the data to offsets within the replacement erase blocks, to lengths within the replacement erase blocks, and to offsets within RAID stripes.

16. The storage system of claim 14, wherein the at least one processor is further configurable to:
   write a metadata indicating such mapping to RAID stripes differing from RAID stripes to which the data from the erase blocks to be rebuilt belongs, wherein there is more than one replacement erase block.

17. The storage system of claim 14, wherein the at least one processor is further configurable to write further metadata for the replacement erase blocks to one or more RAID stripes differing from the RAID stripe, wherein there is more than one replacement erase block.

18. The storage system of claim 14, wherein the at least one processor is further configurable to determine at least a subset of the erase blocks to be rebuilt based on failure, removal or replacement of a solid-state memory unit.

19. The storage system of claim 14, wherein the at least one processor is further configurable to:
   map more than one erase block to be rebuilt into a replacement erase block.

20. The storage system of claim 14, wherein the replacement erase blocks comprise erase blocks of larger erase block size, smaller erase block size, or a combination of larger and smaller erase block sizes, than the erase blocks to be rebuilt.

* * * * *